(12) United States Patent
Han et al.

(10) Patent No.: US 9,480,007 B2
(45) Date of Patent: Oct. 25, 2016

(54) TECHNIQUES FOR EFFICIENT SMALL CELL DISCOVERY

(71) Applicant: Intel IP Corporation, Santa Clara, CA (US)

(72) Inventors: Seunghee Han, Cupertino, CA (US); Xiaogang Chen, Beijing (CN); Yuan Zhu, Beijing (CN); Alexei Davydov, Nizhny Novgorod (RU); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/318,452

(22) Filed: Jun. 27, 2014

(65) Prior Publication Data

US 2015/0029919 A1    Jan. 29, 2015

Related U.S. Application Data

(60) Provisional application No. 61/859,121, filed on Jul. 26, 2013, provisional application No. 61/863,902, filed on Aug. 8, 2013.

(51) Int. Cl.
*H04W 48/16* (2009.01)
*H04L 5/00* (2006.01)
*H04W 52/02* (2009.01)

(52) U.S. Cl.
CPC ............ *H04W 48/16* (2013.01); *H04L 5/0048* (2013.01); *H04L 5/0073* (2013.01); *H04L 5/001* (2013.01); *H04W 52/0216* (2013.01)

(58) Field of Classification Search
None
See application file for complete search history.

(56) References Cited

U.S. PATENT DOCUMENTS

| | | | | |
|---|---|---|---|---|
| 2013/0077507 A1* | 3/2013 | Yu | .......................... | H04W 48/16 370/252 |
| 2014/0038598 A1* | 2/2014 | Ren | ....................... | H04W 48/16 455/434 |
| 2014/0056220 A1* | 2/2014 | Poitau | .................. | H04W 40/246 370/328 |
| 2014/0302856 A1* | 10/2014 | Nory | ...................... | H04W 48/10 455/437 |
| 2015/0003287 A1* | 1/2015 | Kalhan | .................. | H04W 24/08 370/254 |
| 2015/0078466 A1* | 3/2015 | Zhou | ................... | H04W 56/004 375/260 |
| 2015/0172940 A1* | 6/2015 | Nagata | .................... | H04W 4/06 370/252 |

OTHER PUBLICATIONS

International Search Report and Written Opinion received for PCT Patent Application No. PCT/US2014/048136, mailed Nov. 7, 2014, 12 pages.
Huawei, "Proposed work plan for small cell enhancement SI", 3GPP TSG RAN WG1 Meeting #72, R1-130446, St Julian's, Malta, Jan. 28-Feb. 1, 2013, 3 pages.
CATT, "Control signaling overhead reduction for small cells", 3GPP TSG RAN WG1 Meeting #72bis , R1-130986, Chicago, USA, Apr. 15-19, 2013, 2 pages.

(Continued)

*Primary Examiner* — Hong Cho

(57) ABSTRACT

Techniques for efficient small cell discovery are described. In one embodiment, for example, an evolved node B (eNB) may comprise logic, at least a portion of which is in hardware, the logic to determine a discovery signal transmission schedule for a series of radio frames based on a discovery signal muting pattern specifying at least one discovery-muted radio frame among the series of radio frames, and a transceiver to transmit at least one primary synchronization signal (PSS) and at least one secondary synchronization signal (SSS) during the series of radio frames according to the discovery signal transmission schedule. Other embodiments are described and claimed.

25 Claims, 14 Drawing Sheets

(56) References Cited

OTHER PUBLICATIONS

"Interference Management for Small Cell Enhancements", Broadcom Corporation, 3GPP TSG RAN WG1 Meeting #72bis, R1-131474, Chicago, IL, USA, Apr. 15-19, 2013, 4 pages (author unknown).

"Analysis and design considerations of cell on/off in small cell", LG Electronics, 3GPP TSG RAN WG1 Meeting #73, R1-132236, Fukuoka, Japan, May 20-24, 2013, 6 pages (author unknown).

Search Report and Office Action received for Taiwanese Patent Application No. 103124910, mailed Mar. 21, 2016, 11 pages including 4 pages English translation.

Volker et al., "Inter-Cell Interference Coordination for LTE-A", Nomor Research GmbH, Munich, Germany (Sep. 2011), 4 pages.

* cited by examiner

FIG. 7
700

| 0 | 1 | 0 | 1 | 0 | 1 | 1 | 1 |
|---|---|---|---|---|---|---|---|
| 0 | 1 | 2 | 3 | 4 | 5 | 6 | 7 |

←——Notional Frames——→

Cell 0

FIG. 8
800

| | | | | | | | |
|---|---|---|---|---|---|---|---|
| 1 | 0 | 0 | 1 | 0 | 0 | 0 | 0 |
| 0 | 1 | 0 | 0 | 1 | 0 | 1 | 1 |
| 0 | 0 | 1 | 0 | 0 | 1 | 0 | 0 |
| 0 | 1 | 2 | 3 | 4 | 5 | 6 | 7 |

←——Notional Frames——→

Cell 0
Cell 1
Cell 2

```
DETERMINE DISCOVERY SIGNAL
TRANSMISSION SCHEDULE FOR SERIES OF
RADIO FRAMES BASED ON DISCOVERY
SIGNAL MUTING PATTERN SPECIFYING AT
LEAST ONE DISCOVERY-MUTED RADIO
FRAME AMONG SERIES OF RADIO FRAMES
1102
```

```
TRANSMIT AT LEAST ONE PRIMARY
SYNCHRONIZATION SIGNAL AND AT LEAST
ONE SECONDARY SYNCHRONIZATION
SIGNAL DURING SERIES OF RADIO FRAMES
ACCORDING TO DISCOVERY SIGNAL
TRANSMISSION SCHEDULE
1104
```

SELECT FIRST SET OF CARRIERS AND SECOND SET OF CARRIERS FROM AMONG PLURALITY OF CARRIERS IN FREQUENCY BAND OF eNB BASED ON DISCOVERY SIGNAL TRANSMISSION PATTERN, THE FIRST SET OF CARRIERS COMPRISING AT LEAST ONE NON-CENTRAL CARRIER OF THE PLURALITY OF CARRIERS
*1202*

TRANSMIT FIRST SET OF SMALL CELL DISCOVERY SIGNALS OVER FIRST SET OF CARRIERS DURING FIRST FRAME
*1204*

TRANSMIT SECOND SET OF SMALL CELL DISCOVERY SIGNALS OVER SECOND SET OF CARRIERS DURING SECOND FRAME
*1206*

*FIG. 14*

_Storage Medium 1400_

*Computer Executable Instructions for 1100*

*Computer Executable Instructions for 1200*

*Computer Executable Instructions for 1300*

Broadband Wireless Access System
1600

US 9,480,007 B2

TECHNIQUES FOR EFFICIENT SMALL CELL DISCOVERY

RELATED CASE

This application claims priority to U.S. Provisional Patent Application No. 61/859,121, filed Jul. 26, 2013, and U.S. Provisional Patent Application No. 61/863,902, filed Aug. 8, 2013, the entireties of which are hereby incorporated by reference.

TECHNICAL FIELD

Embodiments herein generally relate to communications between devices in broadband wireless communications networks.

BACKGROUND

In an evolved Universal Mobile Telecommunications System Terrestrial Radio Access Network (E-UTRAN), a user equipment (UE) may discover any particular cell based on received discovery signals, such as primary synchronization signals (PSSs) and secondary synchronization signals (SSSs), that are associated with that cell. In some cases, a UE may be within reception range of discovery signals for a small cell and discovery signals for a macrocell or second small cell at the same time. If both cells use the same time and frequency resources to transmit their respective discovery signals, those discovery signals may interfere with each other at the location of the UE. With respect to the E-UTRAN as a whole, this phenomenon may generally inhibit the ability of UEs to associate with small cells.

BRIEF DESCRIPTION OF THE DRAWINGS

FIG. 7 illustrates an embodiment of a discovery signal muting pattern.
FIG. 8 illustrates an embodiment of a set of discovery signal muting patterns.
FIG. 11 illustrates an embodiment of a first logic flow.
FIG. 12 illustrates an embodiment of a second logic flow.
FIG. 14 illustrates an embodiment of a storage medium.

DETAILED DESCRIPTION

Figure 1:
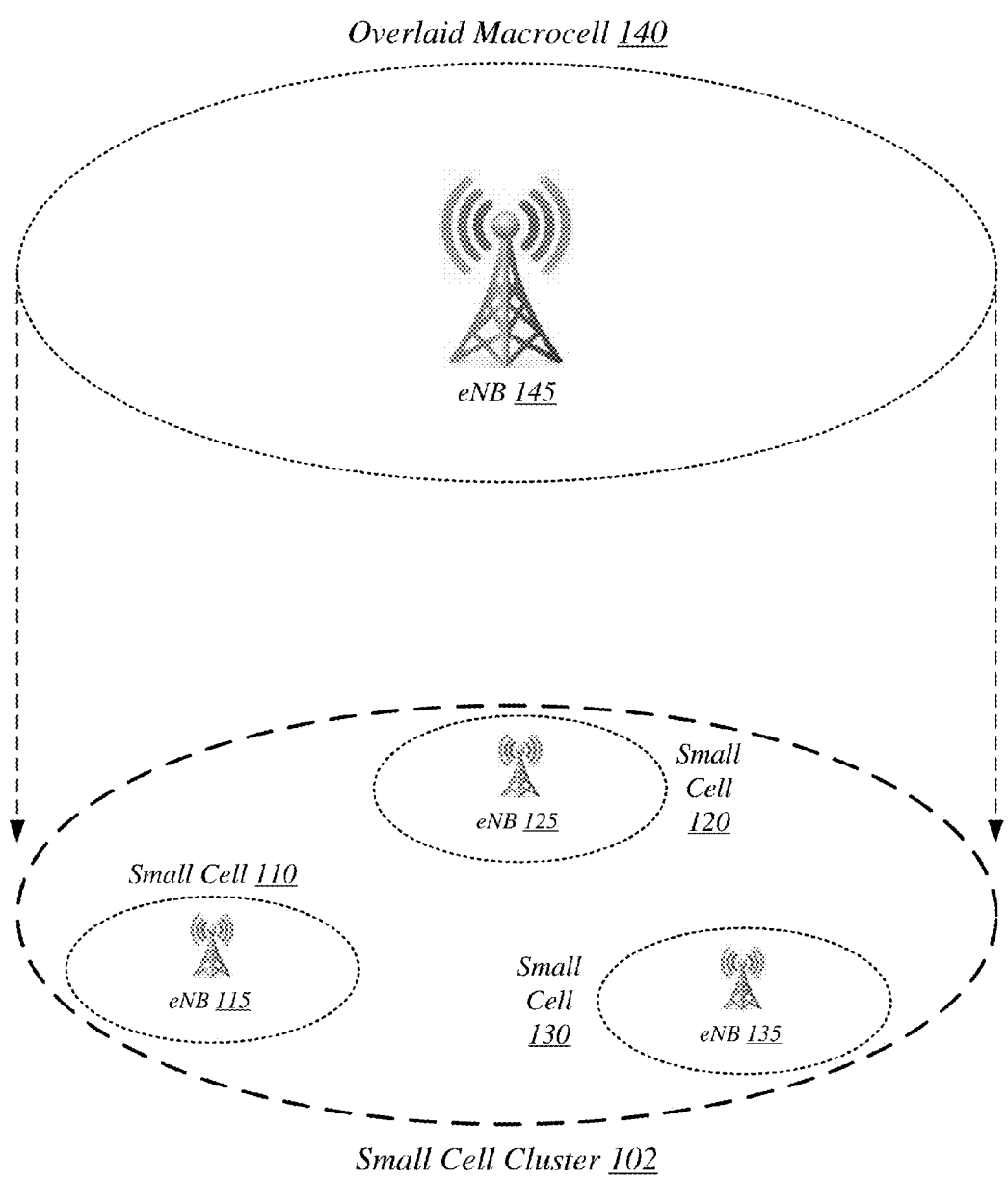
FIG. 1 illustrates an embodiment of a first operating environment.

Various embodiments may be generally directed to techniques for efficient small cell discovery. In one embodiment, for example, an evolved node B (eNB) may comprise logic, at least a portion of which is in hardware, the logic to determine a discovery signal transmission schedule for a series of radio frames based on a discovery signal muting pattern specifying at least one discovery-muted radio frame among the series of radio frames, and a transceiver to transmit at least one primary synchronization signal (PSS) and at least one secondary synchronization signal (SSS) during the series of radio frames according to the discovery signal transmission schedule. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 such as may be representative of various embodiments in which techniques for small cell discovery may be implemented. In operating environment 100, a small cell cluster 102 comprises a plurality of small cells including a small cell 110, a small cell 120, and a small cell 130. Small cells 110, 120, and 130 are served by respective eNBs 115, 125, and 135. Overlaid on the small cell cluster 102 is an overlaid macrocell 140, which is served by an eNB 145.

Figure 2:
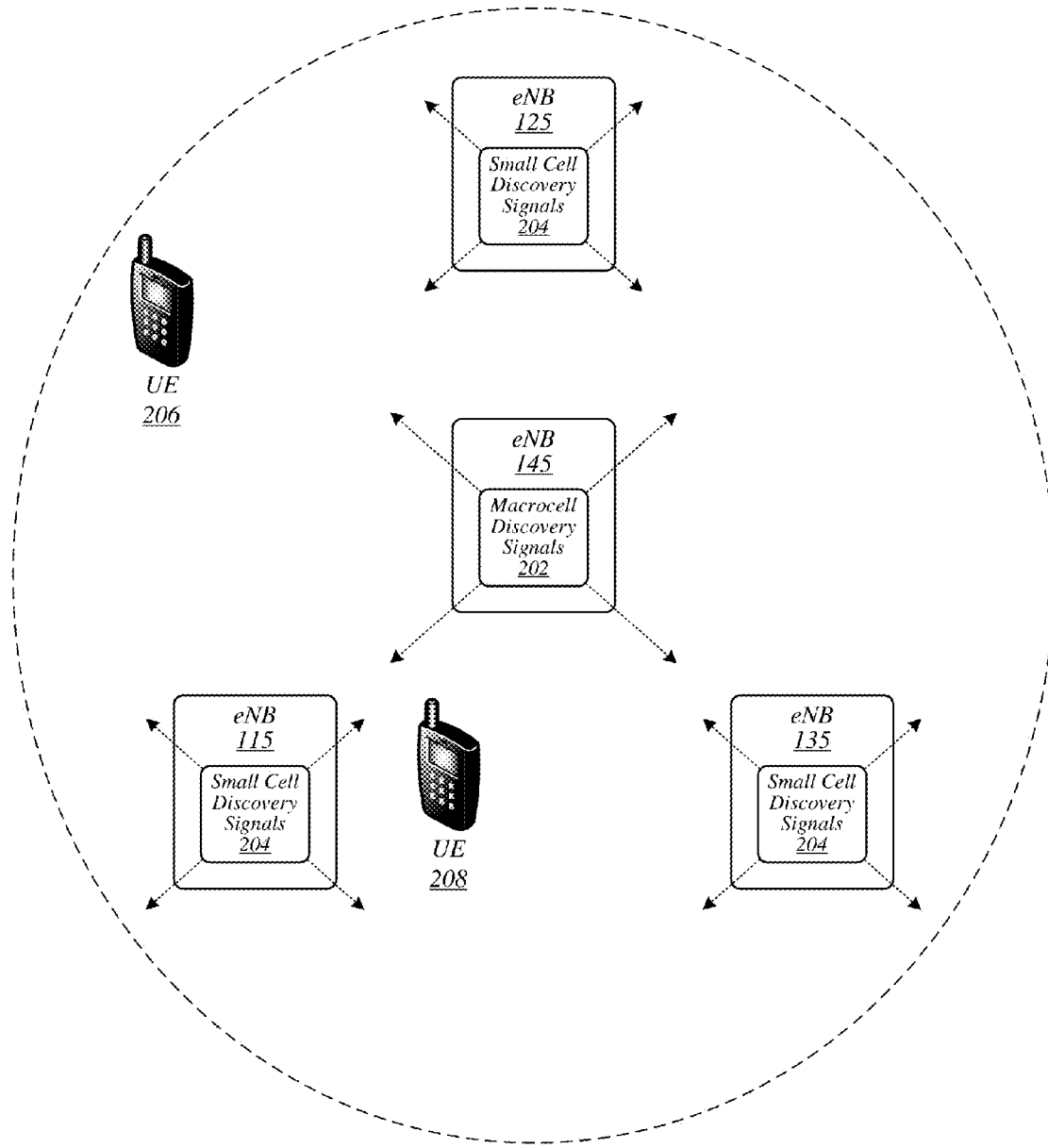
FIG. 2 illustrates an embodiment of a second operating environment.

FIG. 2 illustrates an operating environment 200 such as may be representative of some embodiments in which techniques for small cell discovery may be implemented. More particularly, operating environment 200 may be representative of transmissions that the various eNBs in operating environment 100 of FIG. 1 may perform in various embodiments. In operating environment 200, each of eNBs 115, 125, 135, and 145 transmits discovery signals to enable its discovery by user equipment (UEs) located within its coverage area. Namely, eNB 145 transmits macrocell discovery signals 202, and eNBs 115, 125, and 135 transmit small cell discovery signals 204. In some embodiments, macrocell discovery signals 202 and/or small cell discovery signals 204 may comprise, for example, primary synchronization signals (PSSs), secondary synchronization signals (SSSs), and/or cell-specific reference signals (CRSs) as defined in 3GPP TS 36.211. The embodiments are not limited to these examples.

According to conventional techniques, the various eNBs in operating environment 200 may all transmit their respective discovery signals according to a same timing schedule. For example, during each radio frame, eNBs 115, 125, 135, and 145 may each transmit respective PSSs and SSSs during the same time intervals within the same subframes. Additionally, the various eNBs may transmit their discovery signals using the central carriers of their respective frequency bands. If the various eNBs utilize like central carrier frequencies, then they will all transmit their respective discovery signals over the same carriers during the same time intervals. As a result, the discovery signals may interfere with each other. The extent of this interference may depend on the degree of cross-correlation between the discovery signals. If the degree of cross-correlation between two discovery signals is high during a given radio frame, then those two discovery signals may substantially interfere with each other during that radio frame. According to conventional techniques, each eNB may vary the discovery signatures that it transmits within a subframe, but may repeat the same pattern of discovery signatures during each successive radio frame. As such, discovery signals that substantially interfere with each other during one radio frame may be expected to substantially interfere with each other during each successive radio frame as well.

It will be appreciated that the tendency of discovery signals to interfere with each other may also be a function of the position at which those discovery signals are received. For example, at the position of UE 206 in operating environment 200, small cell discovery signals 204 may not substantially interfere with macrocell discovery signals 202. On the other hand, at the position of UE 206 in operating environment 200, small cell discovery signals 204 may substantially interfere with macrocell discovery signals 202. As a result, in order to perform discovery, UE 206 may need to accumulate discovery signals over a lengthy acquisition time. The use of repeated discovery signatures may cause this effect to be especially pronounced, by precluding or hindering the use of interference averaging techniques. In dense small cell deployments, there may be many regions in which interference between discovery signals may potentially disrupt cell discovery.

Disclosed herein are techniques for efficient small cell discovery that may facilitate improved small cell discovery efficiency and/or discovery acquisition time reduction in various embodiments. According to some efficient small cell discovery techniques disclosed herein, eNBs may intermittently mute their discovery signal transmissions based on discovery signal muting patterns. According to various efficient small cell discovery techniques disclosed herein, eNBs may additionally or alternatively transmit their discovery signals over non-central carriers. According to some efficient small cell discovery techniques disclosed herein, eNBs may vary the subframes, orthogonal frequency division multiple access (OFDMA) symbol positions, and/or carriers via which the transmit their discovery signals over time. The embodiments are not limited to these example techniques.

Figure 3:
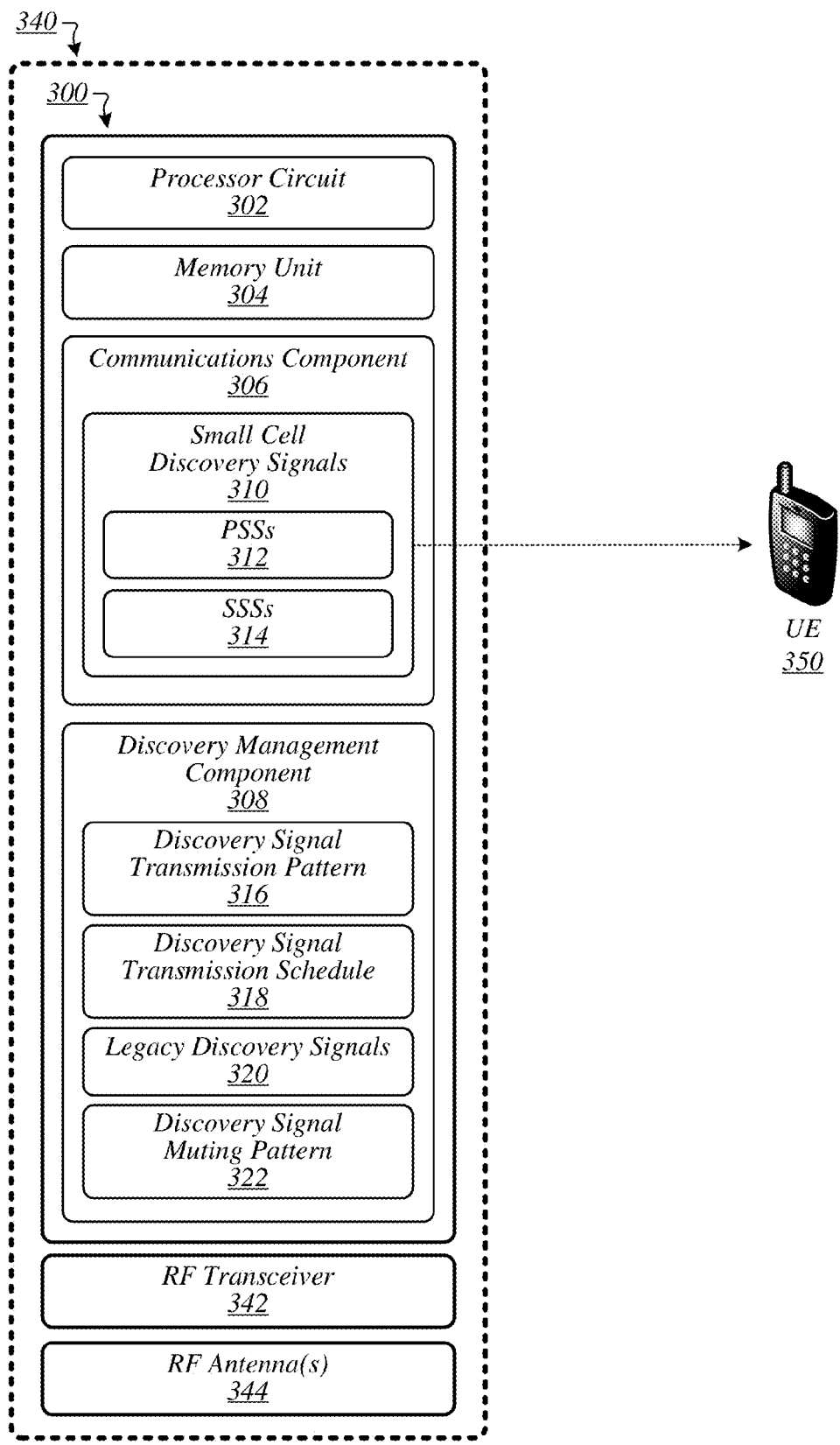
FIG. 3 illustrates an embodiment of a first apparatus and an embodiment of a first system.

FIG. 3 illustrates a block diagram of an apparatus 300. Apparatus 300 may be representative of a small cell eNB that implements techniques for efficient small cell discovery in various embodiments. As shown in FIG. 3, apparatus 300 comprises multiple elements including a processor circuit 302, a memory unit 304, a communications component 306, and a discovery management component 308. The embodiments, however, are not limited to the type, number, or arrangement of elements shown in this figure.

In some embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In various embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in some embodiments. The embodiments are not limited in this context.

In various embodiments, apparatus 300 may comprise a communications component 306. Communications component 306 may comprise logic, circuitry, and/or instructions operative to send messages to one or more remote devices and/or to receive messages from one or more remote devices. In some embodiments, communications component 306 may be operative to send and/or receive messages over one or more wired connections, one or more wireless connections, or a combination of both. In various embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 300 may comprise a discovery management component 308. Discovery management component 308 may comprise logic, circuitry, and/or instructions operative to select and/or implement discovery signal muting patterns for implementation in conjunction with discovery signal transmission on the part of apparatus 300. In various embodiments, discovery management component 308 may additionally or alternatively be operative to manage the selection of carriers, subframes, and/or OFDMA symbol positions via which discovery signals are transmitted. In some embodiments, discovery management component 308 may additionally or alternatively be operative to manage discovery signal composition selections. The embodiments are not limited in this context.

FIG. 3 also illustrates a block diagram of a system 340. System 340 may comprise any of the aforementioned elements of apparatus 300. System 340 may further comprise a radio frequency (RF) transceiver 342. RF transceiver 342 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 342 may operate in accordance with one or more applicable standards in any version. The embodiments are not limited in this context.

In various embodiments, system 340 may comprise one or more RF antennas 344. Examples of any particular RF antenna 344 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 342 may be operative to send and/or receive messages and/or data using one or more RF antennas 344. The embodiments are not limited in this context.

During general operation, apparatus 300 and/or system 340 may be operative to periodically transmit small cell discovery signals 310 to enable remote devices such as UEs to discover apparatus 300 and/or system 340. In various embodiments, communications component 306 may be operative to generate the small cell discovery signals 310. In some embodiments, the small cell discovery signals 310 may comprise primary synchronization signals (PSSs) 312 and/or secondary synchronization signals (SSSs) 314. In various such embodiments, PSSs 312 and/or SSSs 314 may comprise dedicated small cell PSSs and/or SSSs of different formats than those defined for macrocell PSSs and SSSs. In other such embodiments, PSSs 312 and/or SSSs 314 may comprise formats that are the same as those defined for macrocell PSSs and SSSs. The embodiments are not limited in this context.

It is worthy of note that although FIG. 3 depicts an example in which small cell discovery signals 310 comprise PSSs 312 and SSSs 314, the embodiments are not limited to this example. In some embodiments, in addition to or instead of PSSs 312 and/or SSSs 314, small cell discovery signals 310 may comprise any or all of cell-specific reference signals (CRSs), channel state information reference signals (CSI-RSs), demodulation reference signals (DM-RSs), physical random access channel (PRACH) preambles, and/or sounding reference signals (SRSs). The embodiments are not limited to these additional examples.

In various embodiments, discovery management component 308 may be operative to determine a discovery signal transmission pattern 316. Discovery signal transmission pattern 316 may comprise information identifying, for a notional radio frame or set of radio frames, the time and frequency resources of the notional frame(s) that are to be utilized to transmit small cell discovery signals 310. In some embodiments, within a notional radio frame, discovery signal transmission pattern 316 may identify one or more subframes during which small cell discovery signals 310 are to be transmitted. In various embodiments, within each such subframe, discovery signal transmission pattern 316 may identify one or more OFDMA symbol positions during which small cell discovery signals 310 are to be transmitted. In some embodiments, for any given notional radio frame, subframe, or OFDMA symbol position, discovery signal transmission pattern 316 may identify one or more carriers over which small cell discovery signals 310 are to be transmitted. In an example, with respect to a notional radio frame, discovery signal transmission pattern 316 may indicate that small cell discovery signals 310 are to be transmitted over a set of central carriers using OFDMA symbol positions 5 and 6 within subframes 0 and 5. It is worthy of note that as used herein in reference to a given frequency band, the term "central carrier" is intended to refer to a carrier that is adjacent to the center frequency of that frequency band. The embodiments are not limited in this context.

Figure 4:
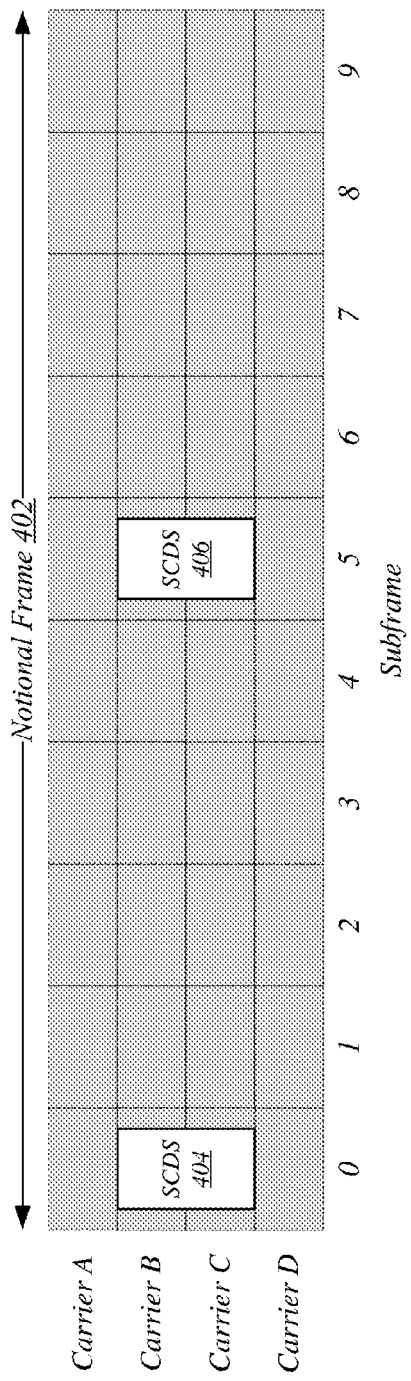
FIG. 4 illustrates an embodiment of a first channel resource usage diagram.

FIG. 4 illustrates a channel resource usage diagram 400 such as may be representative of various embodiments. More particularly, channel resource usage diagram 400 may be representative of a first example of discovery signal transmission pattern 316 of FIG. 3 in some embodiments. Channel resource usage diagram 400 reflects a discovery signal transmission pattern that applies to a notional frame 402. Using some of the OFDMA symbol positions within subframe 0 of the notional frame 402, small cell discovery signals (SCDSs) 404 are transmitted via central carriers B and C. Using some of the OFDMA symbol positions within subframe 5 of the notional frame 402, SCDSs 406 are transmitted via central carriers B and C. In various embodiments, SCDSs 406 may be the same as the SCDSs 404. In some other embodiments, the SCDSs 406 may differ from the SCDSs 404. In various embodiments, SCDSs 404 and/or SCDSs 406 may comprise PSSs and/or SSSs. In some embodiments, SCDSs 404 and/or SCDSs 406 may comprise legacy discovery signals. In various embodiments, SCDSs 404 and/or SCDSs 406 may comprise dedicated small cell discovery signals that differ from legacy discovery signals used in macrocells. The embodiments are not limited in this context.

Figure 5:
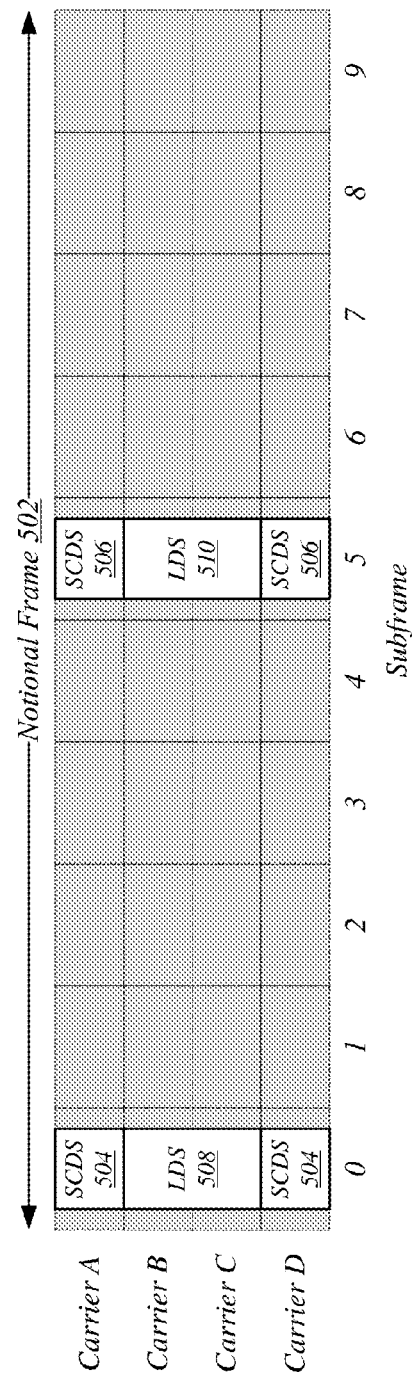
FIG. 5 illustrates an embodiment of a second channel resource usage diagram.

FIG. 5 illustrates a channel resource usage diagram 500 such as may be representative of some embodiments. More particularly, channel resource usage diagram 500 may be representative of a second example of discovery signal transmission pattern 316 of FIG. 3. In the example of FIG. 5, rather than being transmitted over central carriers B and C, SCDSs 504 and 506 are transmitted over non-central carriers A and D. Further, SCDSs 504 and 506 comprise dedicated small cell discovery signals that differ from legacy discovery signals 508 and 510. To preserve legacy support, LDSs 508 and 510 are transmitted concurrently with SCDSs 504 and 506, over central carriers B and C. It is to be appreciated that in various other embodiments, SCDSs 504 and 506 may comprise legacy discovery signals and/or may be transmitted over non-central carriers A and D without LDSs 508 and 510 being transmitted over central carriers B and C. The embodiments are not limited in this context.

Returning to FIG. 3, in some embodiments, discovery management component 308 may be operative to determine a discovery signal transmission schedule 318 based on discovery signal transmission pattern 316. Discovery signal transmission schedule 318 may comprise information defining a schedule for transmission of small cell discovery signals 310 during one or more actual upcoming radio frames. More particularly, in various embodiments, for each of one or more upcoming radio frames, discovery signal transmission schedule 318 may identify one or more subframes, OFDMA symbol positions, and/or carriers over which small cell discovery signals 310 are to be transmitted during that upcoming radio frame. In some embodiments, discovery signal transmission schedule 318 may additionally identify one or more subframes, OFDMA symbol positions, and/or carriers over which legacy discovery signals 320 are to be transmitted during the one or more upcoming radio frames. As noted above, in various embodiments, small cell discovery signals 310 may themselves comprise legacy discovery signals rather than comprising dedicated small cell discovery signals. The embodiments are not limited in this context.

In some embodiments, discovery signal transmission pattern 316 may define the time and frequency resources to be used to transmit small cell discovery signals 310 at a single frame level of granularity, such as reflected in example channel resource usage diagrams 400 and 500 of FIGS. 4 and 5. In various embodiments, discovery management component 308 may be operative to determine the discovery signal transmission schedule 318 for one or more upcoming frames by applying the same single-frame pattern defined by discovery signal transmission pattern 316 to each of the one or more upcoming frames. In some other embodiments, discovery signal transmission pattern 316 may define the time and frequency resources to be used to transmit small cell discovery signals 310 at a multi-frame level of granularity. In other words, in various embodiments, discovery signal transmission pattern 316 may comprise a pattern that spans multiple radio frames.

Figure 6:
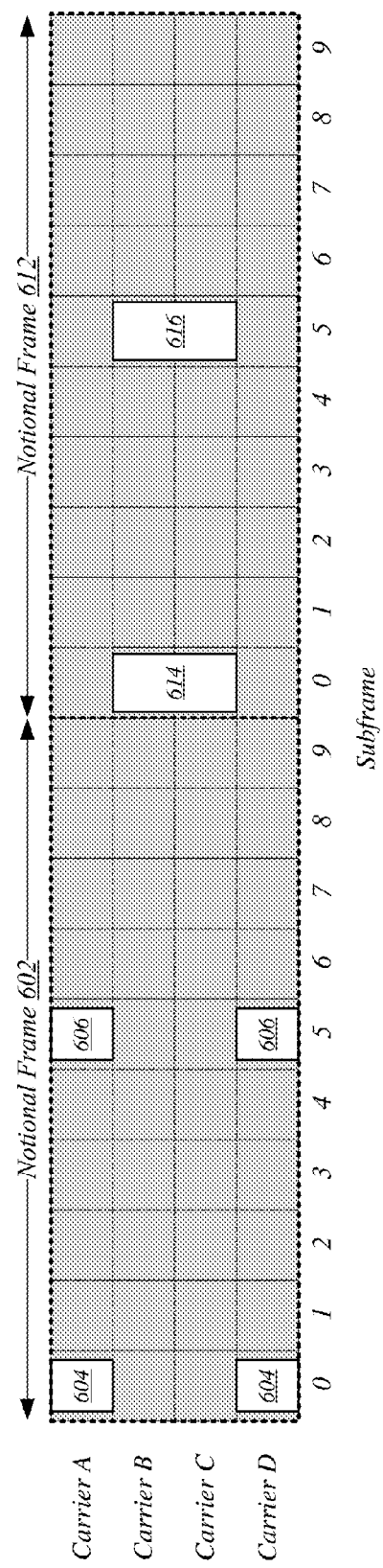
FIG. 6 illustrates an embodiment of a third channel resource usage diagram.

FIG. 6 illustrates a channel resource usage diagram 600 such as may be representative of some such embodiments. More particularly, channel resource usage diagram 600 may be representative of a third example of discovery signal transmission pattern 316 of FIG. 3, according to which the defined pattern spans two notional radio frames. In the example of FIG. 6, SCDSs 604 and 606 are transmitted over non-central carriers A and D during subframes 0 and 5 of a notional frame 602. During the following notional frame 612, SCDSs 614 and 616 are transmitted over central carriers B and C during subframes 0 and 5. Thus channel resource usage diagram 600 reflects a discovery signal transmission pattern according to which, for each successive frame, discovery signal transmission alternates between transmission of SCDSs on non-central carriers and transmission of SCDSs on central carriers.

It is worthy of note that although FIG. 6 depicts an example in which a multi-frame cycle involves alternating the carriers used to transmit small cell discovery signals from frame to frame, the embodiments are not limited to this example. Returning to FIG. 3, in various embodiments, discovery signal transmission pattern 316 may define a multi-frame cycle according to which the subframes and/or OFDMA symbol positions used to transmit small cell discovery signals vary over time. For example, in some embodiments, discovery signal transmission pattern 316 may define a frequency-hopping scheme, according to which the carriers used to convey small cell discovery signals 310 are changed from frame to frame. In various embodiments, discovery signal transmission pattern 316 may define a multi-frame cycle according to which the utilized discovery signatures vary over time. In some embodiments, discovery signal transmission pattern 316 may define a multi-frame cycle that features a combination of any or all of these variances, and/or one or more other types of variances. Furthermore, any or all of these variances may comprise variances among more than two states rather alternations between two states. The embodiments are not limited in this context.

In various embodiments, discovery management component 308 may be operative to determine the discovery signal transmission schedule 318 for one or more upcoming frames based on a discovery signal transmission pattern 316 that defines a multi-frame cycle such as that depicted in the example of FIG. 6. In some embodiments, in so doing, discovery management component 308 may be operative to determine which notional frame of the multi-frame cycle was or will be reflected in an actual frame immediately preceding the first upcoming frame of the discovery signal transmission schedule 318. Discovery management component 308 may then be operative to apply the next notional frame of the cycle to the first upcoming frame of the discovery signal transmission schedule 318. The embodiments are not limited in this context.

In various embodiments, discovery management component 308 may additionally or alternatively be operative to determine the discovery signal transmission schedule 318 for one or more upcoming radio frames in conjunction with discontinuous transmission (DTX) mode operation on the part of a cell served by apparatus 300 and/or system 340. In some embodiments, in conjunction with DTX operation, discovery management component 308 may be operative to implement an extended time between small cell discovery signal transmissions in order to reduce overhead and/or conserve power. For example, in various embodiments, an extended interval of greater than 5 ms between small cell discovery signal transmissions may be implemented in conjunction with DTX operation. In some embodiments, in conjunction with DTX operation, discovery management component 308 may be operative to implement a reduced time between small cell discovery signal transmissions in order to provide more frequent opportunities for UEs to successfully complete small cell discovery. For example, in various embodiments, a reduced interval of less than 5 ms between small cell discovery signal transmissions may be implemented in conjunction with DTX operation. The embodiments are not limited to these examples.

In some embodiments, discovery management component 308 may additionally or alternatively be operative to determine the discovery signal transmission schedule 318 for one or more upcoming frames based on a discovery muting pattern 322. Discovery muting pattern 322 may comprise information indicating a pattern according to which small cell discovery signals 310 are to be intermittently muted. In various embodiments, discovery muting pattern 322 may identify, for a notional set of radio frames, one or more frames, subframes, OFDMA symbol positions, and/or carriers for which discovery signal transmission is to be muted. In some embodiments, discovery muting pattern 322 may identify such information distinctly for each of multiple discovery signals. In various embodiments, discovery muting pattern 322 may reflect a defined periodicity. In some such embodiments, discovery muting pattern 322 may identify frames, subframes, OFDMA symbol positions, and/or carriers to be muted within one or more of a number of notional radio frames that equals the defined periodicity. In an example embodiment, discovery muting pattern 322 may reflect a defined periodicity of eight frames, and thus may comprise information indicating how discovery signal muting is to be performed for each successive set of eight frames. In various other embodiments, discovery signal muting pattern 322 may reflect a periodicity defined in units other than frames. For example, in some embodiments, discovery signal muting pattern 322 may reflect a defined periodicity of a certain number of subframes, OFDMA symbol positions, or other time durations. The embodiments are not limited in this context.

In various embodiments, the muting specified by discovery signal muting pattern 322 may apply only to the discovery signal transmissions within the affected frames, subframes, OFDMA symbol positions, or other time durations. In other words, in some embodiments, non-discovery signals may still be transmitted during a period of discovery signal muting. In various other embodiments, the muting specified by discovery signal muting pattern 322 may apply to all carrier resources during the period of discovery signal muting. In some embodiments, the muting specified by discovery signal muting pattern 322 may apply to an entire cell served by apparatus 300 and/or system 340, such that the cell is to enter a dormant state during periods of discovery muting. In various embodiments, the muting specified by discovery signal muting pattern 322 may apply only to particular types of discovery signal transmissions within the affected frames, subframes, OFDMA symbol positions, or other time durations. For example, in some embodiments, legacy discovery signals 320 may be transmitted during a muting period for small cell discovery signals 310. In various other embodiments, the muting specified by discovery signal muting pattern 322 may apply to all discovery signals. The embodiments are not limited in this context.

Hereinafter, in reference to a given radio frame, subframe, OFDMA symbol position, or other time interval, the term "discovery-muted" shall be employed to denote that at least a portion of at least one discovery signal is muted within that given radio frame, subframe, OFDMA symbol position, or other time interval. Thus, for example, a discovery-muted frame comprises a frame during which at least a portion of at least one discovery signal is muted. It is to be appreciated that not all discovery signals within a particular discovery-muted radio frame, subframe, OFDMA symbol position, or other time interval may necessarily be muted. For example, a particular discovery-muted frame may comprise small cell discovery signals 310 that are muted as well as legacy discovery signals 320 that are not muted. The embodiments are not limited to this example.

FIG. 7 illustrates a discovery signal muting pattern 700 such as may comprise a representative example of discovery signal muting pattern 322 in some embodiments. As shown in FIG. 7, discovery signal muting pattern 700 features a periodicity of eight notional radio frames, and comprises a binary muting value corresponding to each one of those eight notional radio frames. Each muting value indicates whether a serving eNB of a cell 0 is to perform discovery signal muting during the notional radio frame corresponding to that muting value. In this example, the muting value '0' may represent muting and the muting value '1' may represent the absence of muting. According to this convention, discovery signal muting pattern 700 indicates that the serving eNB for cell 0 is to perform discovery signal muting during notional frames 0, 2, and 4, but not during notional frames 1, 3, 5, 6, or 7. It will be appreciated that the reverse convention could be used instead, according to which the muting value '1' represents muting and the muting value '0' represents the absence of muting. Further, in various embodiments, any given discovery signal muting pattern may utilize other types of values or information to indicate the presence or absence of muting. The embodiments are not limited in this context.

Returning to FIG. 3, in some embodiments, discovery management component 308 may be operative to autonomously select discovery signal muting pattern 322. In various other embodiments, discovery management component 308 may be statically preconfigured with discovery signal muting pattern 322. In yet other embodiments, discovery management component 308 may be configured with discovery signal muting pattern 322 via higher layer signaling. Presented in an abstract syntax notation format below is a DS-Info information element (IE) such as may comprise an example of an IE used to configure discovery signal muting pattern 322 via higher layer signaling in some embodiments:

```
DS-Info ::= SEQUENCE {
...
    physCellId              INTEGER (0..503),
    cellGlobalId            ECGI
    ds-MutingInfo           CHOICE {
        do2                 BIT STRING (SIZE(2)),
        do4                 BIT STRING (SIZE(4)),
        do8                 BIT STRING (SIZE(8)),
        do16                BIT STRING (SIZE(16)),
        ...
    }
}
``` where ds-MutingInfo represents a bit string that defines a discovery signal muting pattern. The embodiments are not limited to this example.

In various embodiments, the design of discovery signal muting pattern 322 may reflect a periodicity selected based on network load levels. In some embodiments, the design of discovery signal muting pattern 322 may be coordinated with the designs of one or more other discovery signal muting patterns. For example, in various embodiments in which apparatus 300 and/or system 340 comprises an eNB for a particular cell, the design of discovery signal muting pattern 322 may be coordinated with the designs of the discovery signal muting patterns for one or more neighboring cells.

FIG. 8 illustrates a set of discovery signal muting patterns 800 such as may be representative of some such embodiments. In this example, the muting patterns for respective cells 0, 1, and 2 are designed to implement a "round robin" format for discovery signal transmission, according to which the cells 0, 1, and 2 take turns transmitting discovery signals. During each notional frame, discovery signals may be transmitted in one cell while they are muted in the other two cells. For example, during notional frame 0, discovery signals may be transmitted in cell 0 while they are muted in cells 1 and 2. The embodiments are not limited to this example.

Returning to FIG. 3, in various embodiments, communications component 306 may be operative to directly or indirectly communicate with one or more remote eNBs and/or other remote devices in order to enable discovery management component 308 to dynamically coordinate the design of discovery signal muting pattern 322 with the designs of one or more other discovery signal muting patterns. In some other embodiments, discovery management component 308 may be statically preconfigured with a discovery signal muting pattern 322 featuring a design that has been coordinated with the designs of one or more other discovery signal muting patterns. In yet other embodiments, discovery management component 308 may be configured with a discovery signal muting pattern 322 featuring a design that has been coordinated with the designs of one or more other discovery signal muting patterns via higher layer signaling. The embodiments are not limited in this context.

In various other embodiments, discovery management component 308 may be operative to implement one or more muting pattern determination algorithms in order to determine discovery signal muting pattern 322. In some embodiments, discovery management component 308 may be operative to implement one or more muting pattern determination algorithms designed to create variations in the discovery signal muting patterns of neighboring cells without requiring actual coordination between those cells. In various embodiments, for example, discovery management component 308 may be operative to implement a muting pattern determination algorithm according to which the muting values for a given cell are determined as a function of that cell's physical cell identifier (PCID). In an example embodiment, discovery management component 308 may be operative to determine discovery signal muting pattern 322 according to the Equations (1) and (2) that follow:

$$MutingValue(PCID, N) = \text{sgn}(\text{mod}(PCID + N, M)) \qquad (1)$$

$$\text{sgn}(x) = \begin{cases} -1 & \text{if } x < 0 \\ 0 & \text{if } x = 0 \\ 1 & \text{if } x > 0 \end{cases} \qquad (2)$$

where PCID represents the physical cell identifier of a given cell, N represents a notional radio frame number, MutingValue(PCID,N) represents a binary muting value for the given cell during the notional radio frame N, M represents a periodicity for the discovery signal muting pattern, and mod(a,b) represents the remainder of the Euclidean division of a by b. It is worthy of note that a given muting pattern determination algorithm may implement Equations (1) and (2) based on a convention that muting value '0' represents muting and muting value '1' represents the absence of muting, or may instead implement Equations (1) and (2) based on a convention that muting value '1' represents muting and muting value '0' represents the absence of muting. The embodiments are not limited in this context.

In some embodiments, discovery management component 308 may be operative to implement a PCID-based muting pattern determination algorithm according to which muting values are determined with multi-cell granularity. In an example embodiment, discovery management component 308 may be operative to determine discovery signal muting pattern 322 according to Equation (2) above and the Equation (3) that follows:

$$MutingValue(PCID, N) = \text{sgn}\left(\text{mod}\left(\left\lfloor \frac{PCID}{K} \right\rfloor + N, M\right)\right) \qquad (3)$$

where K represents the number of cells of the granularity, and $$\left\lfloor \frac{a}{b} \right\rfloor$$

represents the quotient of the Euclidean division of a by b. As was the case with respect to Equations (1) and (2) above, a given muting pattern determination algorithm may implement Equation (3) based on a convention that muting value '0' represents muting and muting value '1' represents the absence of muting, or vice versa. The embodiments are not limited in this context.

In various embodiments, discovery management component 308 may be operative to determine the discovery signal transmission schedule 318 for one or more upcoming frames based on discovery signal transmission pattern 316 and discovery signal muting pattern 322. In some embodiments, discovery management component 308 may be operative to determine the discovery signal transmission schedule 318 by applying the muting specified by discovery signal muting pattern 322 to the appropriate frames, subframes, OFDMA symbol positions, carriers, and/or discovery signals among those of discovery signal transmission pattern 316.

Figure 9:
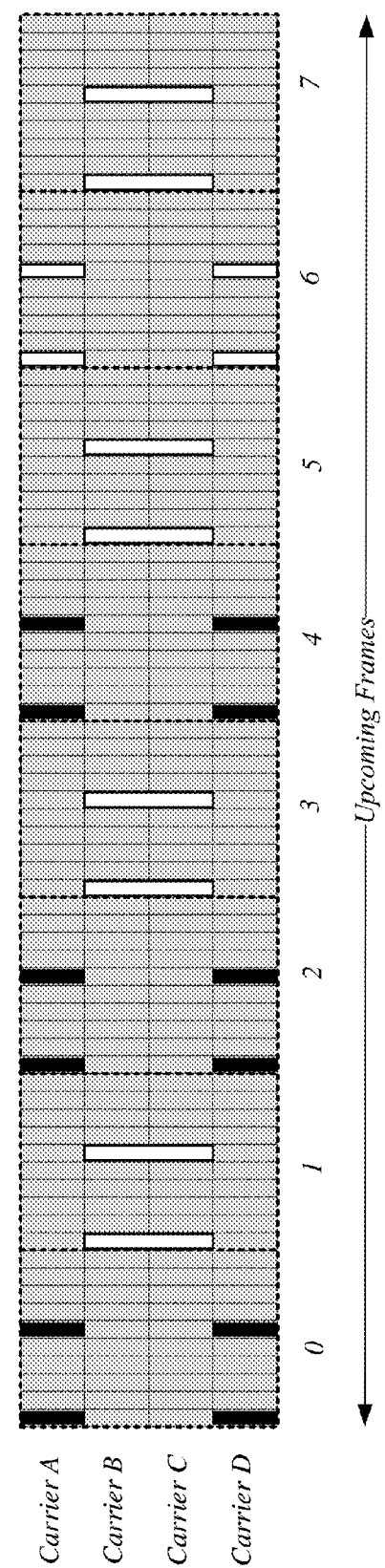
FIG. 9 illustrates an embodiment of a discovery signal transmission schedule.

FIG. 9 illustrates a discovery signal transmission schedule 900 such as may be representative of various embodiments. More particularly, discovery signal transmission schedule 900 may be representative of a discovery signal transmission schedule generated by applying the discovery signal muting pattern 700 of FIG. 7 to the discovery signal transmission pattern reflected in channel resource usage diagram 600 of FIG. 6. As shown in FIG. 9, the cycle reflected in channel resource usage diagram 600 of FIG. 6 repeats four times over the course of the eight upcoming frames described in discovery signal transmission schedule 900. In the absence of muting, small cell discovery signals would be transmitted on outer carriers A and D during upcoming frames 0, 2, 4, and 6, and would be transmitted on inner carriers B and C during upcoming frames 1, 3, 5, and 7. However, assuming that the muting value '0' represents muting in discovery signal muting pattern 700 of FIG. 7, then that pattern specifies that muting is to be performed during upcoming frames 0, 2, and 4. As such, as indicated by the blacked-out elements in upcoming frames 0, 2, and 4, the small cell discovery signals specified by the discovery signal transmission pattern reflected in channel resource usage diagram 600 of FIG. 6 are not included in discovery signal transmission schedule 900, due to application of discovery signal muting pattern 700 of FIG. 7. The embodiments are not limited to this example.

Returning to FIG. 3, in some embodiments, communications component 306 may be operative to send one or more small cell discovery signals 310 during one or more radio frames based on discovery signal transmission pattern 316. In various embodiments, communications component 306 may be operative to send the one or more small cell discovery signals 310 during the one or more radio frames based on discovery signal transmission pattern 316 and discovery signal muting pattern 322. In some embodiments, communications component 306 may be operative to send the one or more small cell discovery signals 310 during the one or more radio frames according to a discovery signal transmission schedule 318 generated based on discovery signal transmission pattern 316 and discovery signal muting pattern 322. It is worthy of note that in various embodiments, rather than generating a discovery signal transmission schedule 318 in advance for the one or more radio frames, discovery management component 308 may be operative to determine discovery signal transmission schedule 318 on-the-fly for each frame, subframe, OFDMA symbol position, or other time interval. For example, discovery management component 308 may be operative to determine discovery signal transmission schedule 318 on-the-fly for each frame, subframe, OFDMA symbol position, or other time interval based on discovery signal transmission pattern 316 and/or discovery signal muting pattern 322. In some embodiments, small cell discovery signals 310 may comprise legacy discovery signals, and may or may not be sent concurrently with legacy discovery signals 320. In various embodiments, small cell discovery signals 310 may comprise dedicated small cell discovery signals, and may or may not be sent concurrently with legacy discovery signals 320. The embodiments are not limited in this context.

In some embodiments, communications component 306 may be operative on RF transceiver 342 and RF antenna(s) 344 to transmit small cell discovery signals 310 within a small cell served by apparatus 300 and/or system 340. In various embodiments, a UE 350 that is located in that small cell and is searching for discovery signals may receive one or more of small cell discovery signals 310. In some embodiments, based on receiving the one or more small cell discovery signals 310, the UE 350 may discover the small cell. In various embodiments, the UE 350 may then initiate an exchange of control messages with apparatus 300 and/or system 340 in order to obtain service from the small cell. The embodiments are not limited in this context.

Figure 10:
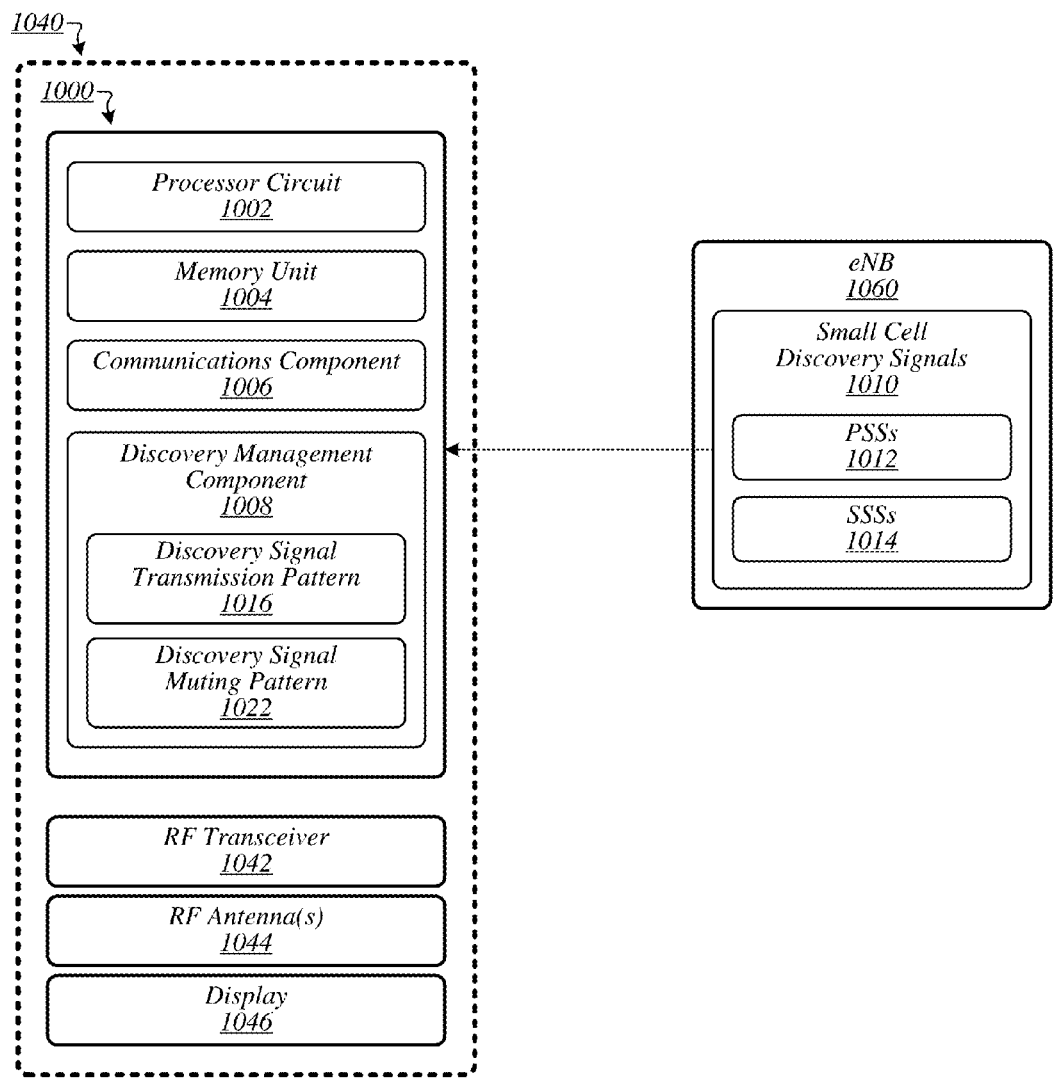
FIG. 10 illustrates an embodiment of a second apparatus and an embodiment of a second system.

FIG. 10 illustrates a block diagram of an apparatus 1000 such as may be representative of UE 350 of FIG. 3 according to some embodiments. As shown in FIG. 10, apparatus 1000 comprises multiple elements including a processor circuit 1002, a memory unit 1004, a communications component 1006, and a discovery management component 1008. The embodiments, however, are not limited to the type, number, or arrangement of elements shown in this figure.

In some embodiments, apparatus 1000 may comprise processor circuit 1002. Processor circuit 1002 may be implemented using any processor or logic device. Examples of processor circuit 1002 may include, without limitation, any of the examples previously presented with respect to processor circuit 302 of FIG. 3. The embodiments are not limited in this context.

In various embodiments, apparatus 1000 may comprise or be arranged to communicatively couple with a memory unit 1004. Memory unit 1004 may be implemented using any machine-readable or computer-readable media capable of storing data, including both volatile and non-volatile memory. Examples of memory unit 1004 may include, without limitation, any of the examples previously presented with respect to memory unit 304 of FIG. 3. It is worthy of note that some portion or all of memory unit 1004 may be included on the same integrated circuit as processor circuit 1002, or alternatively some portion or all of memory unit 1004 may be disposed on an integrated circuit or other medium, for example a hard disk drive, that is external to the integrated circuit of processor circuit 1002. Although memory unit 1004 is comprised within apparatus 1000 in FIG. 10, memory unit 1004 may be external to apparatus 1000 in some embodiments. The embodiments are not limited in this context.

In various embodiments, apparatus 1000 may comprise a communications component 1006. Communications component 1006 may comprise logic, circuitry, and/or instructions operative to send messages to one or more remote devices and/or to receive messages from one or more remote devices. In some embodiments, communications component 1006 may be operative to send and/or receive messages over one or more wired connections, one or more wireless connections, or a combination of both. In various embodiments, communications component 1006 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 1000 may comprise a discovery management component 1008. Discovery management component 1008 may comprise logic, circuitry, and/or instructions operative to initiate, configure, and/or manage one or more procedures for discovering wireless communication cells such as macrocells and/or small cells. In various embodiments, discovery management component 1008 may be operative to initiate, configure, and/or manage one or more discovery signal search procedures, according to which apparatus 1000 may search for macrocell and/or small cell discovery signals. The embodiments are not limited in this context.

FIG. 10 also illustrates a block diagram of a system 1040. System 1040 may comprise any of the aforementioned elements of apparatus 1000. System 1040 may further comprise an RF transceiver 1042. RF transceiver 1042 may comprise one or more radios capable of transmitting and receiving signals using various suitable wireless communications techniques. Such techniques may involve communications across one or more wireless networks. Examples of such wireless networks may include, without limitation, any of the examples previously presented with respect to RF transceiver 342 of FIG. 3. In communicating across such networks, RF transceiver 1042 may operate in accordance with one or more applicable standards in any version. The embodiments are not limited in this context.

In various embodiments, system 1040 may comprise one or more RF antennas 1044. Examples of RF antenna(s) 1044 may include, without limitation, any of the examples previously presented with respect to RF antenna(s) 344 of FIG. 3. In various embodiments, RF transceiver 1042 may be operative to send and/or receive messages and/or data using one or more RF antennas 1044. The embodiments are not limited in this context.

In various embodiments, system 1040 may comprise a display 1046. Display 1046 may comprise any display device capable of displaying information received from processor circuit 1002. Examples for display 1046 may include a television, a monitor, a projector, and a computer screen. In one embodiment, for example, display 1046 may be implemented by a liquid crystal display (LCD), light emitting diode (LED) or other type of suitable visual interface. Display 1046 may comprise, for example, a touch-sensitive display screen ("touchscreen"). In some implementations, display 1046 may comprise one or more thin-film transistors (TFT) LCD including embedded transistors. The embodiments, however, are not limited to these examples.

During general operation, apparatus 1000 and/or system 1040 may be operative to search for discovery signals in order to discover nearby macrocells and/or small cells. In some embodiments, discovery management component 1008 may be operative to initiate a discovery signal search procedure in order to search for discovery signals of a small cell. In various embodiments, the discovery signal search procedure may comprise monitoring one or more carriers for discovery signals during one or more frames, subframes, and/or OFDMA symbol positions of the small cell.

In some embodiments, discovery management component 1008 may be operative to initiate a discovery signal search procedure to search for small cell discovery signals during a series of radio frames. In various embodiments, communications component 1006 may be operative to monitor one or more carriers of the small cell for discovery signals during one or more of the series of radio frames. In some embodiments, discovery management component 1008 may be operative to determine the carrier(s) to be monitored at any particular time based on a discovery signal transmission pattern 1016. In various such embodiments, discovery management component 1008 may be statically preconfigured with the discovery signal transmission pattern 1016. In some other embodiments, discovery management component 1008 may be dynamically configured with discovery signal transmission pattern 1016 via higher layer signaling. In various embodiments, the discovery signal transmission pattern 1016 may be the same as or similar to discovery signal transmission pattern 316 of FIG. 3. In some embodiments, the discovery signal transmission pattern 1016 may define a frequency-hopping scheme for small cell discovery signals of the small cell, according to which the carriers used to convey the small cell discovery signals are changed from frame to frame. In various embodiments, the discovery signal transmission pattern 1016 may assign at least one small cell discovery signal to at least one non-central carrier of the small cell. The embodiments are not limited in this context.

In some embodiments, discovery management component 1008 may be operative to identify one or more discovery-muted radio frames among the series of radio frames. In various embodiments, discovery management component 1008 may be operative to identify the one or more discovery-muted radio frames based on a discovery signal muting pattern 1022 for the small cell. In some embodiments, discovery management component 1008 may be operative to determine the discovery signal muting pattern 1022 based on a physical cell identifier (PCID) of the small cell. For example, in various embodiments, discovery management component 1008 may be operative to determine the discovery signal muting pattern 1022 based on one or more of Equations (1), (2), and (3) above. In some embodiments, the discovery signal muting pattern 1022 may comprise a periodicity of more than one radio frame. The embodiments are not limited in this context.

In various embodiments, from the perspective of apparatus 1000 and/or system 1040, discovery signal muting pattern 1022 may represent a monitoring pattern that identifies a set of subframes or other time intervals as measurement subframes/intervals. In some embodiments, discovery management component 1008 may be operative to assume the existence of discovery reference signals during such measurement subframes/intervals, regardless of the actual transmission configuration of a serving eNB for apparatus 1000 and/or system 1040. The embodiments are not limited in this context.

In various embodiments, discovery management component 1008 may be operative to suspend the discovery signal search procedure during at least one of the one or more discovery-muted radio frames. In some embodiments, suspending the discovery signal search procedure may comprise suspending the monitoring of one or more carriers of the small cell. In various embodiments, monitoring may be suspended only for the particular carrier(s) that comprise discovery signals muted by discovery signal muting pattern 1022. In some such embodiments, monitoring for discovery signals on one or more other carriers may continue. In various other embodiments, monitoring may be suspended for all of the carriers of the small cell when the discovery signal search procedure is suspended. The embodiments are not limited in this context.

In some embodiments, communications component 1006 may be operative to receive one or more small cell discovery signals 1010 via the discovery signal search procedure during one or more of the series of radio frames. In various embodiments, communications component 1006 may be operative to receive the one or more small cell discovery signals 1010 from an eNB 1060. In some embodiments, eNB 1060 may comprise a serving eNB of the small cell. In various embodiments, the one or more small cell discovery signals 1010 may comprise one or more PSSs 1012 and/or one or more SSSs 1014. In some such embodiments, PSSs 1012 and/or SSSs 1014 may comprise dedicated small cell PSSs and/or SSSs of different formats than those defined for macrocell PSSs and SSSs. In other such embodiments, PSSs 1012 and/or SSSs 1014 may comprise formats that are the same as those defined for macrocell PSSs and SSSs. In various embodiments, in addition to or instead of PSSs 1012 and/or SSSs 1014, small cell discovery signals 1010 may comprise any or all of CRSs, CSI-RSs, DM-RMs, PRACH preambles, SRSs, and/or one or more other types of signals. In some embodiments, discovery management component 1008 may be operative to discover a small cell served by the eNB 360 based on the one or more received small cell discovery signals 1010. In various embodiments, communications component 1006 may then be operative to initiate an exchange of control messages with the eNB 1060 in order to obtain service from the small cell. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 11 illustrates one embodiment of a logic flow 1100, which may be representative of the operations executed by one or more embodiments described herein. More particularly, logic flow 1100 may be representative of operations that may be performed in some embodiments by apparatus 300 and/or system 340 of FIG. 3. As shown in logic flow 1100, a discovery signal transmission schedule for a series of radio frames may be determined at 1102 based on a discovery signal muting pattern specifying at least one discovery-muted radio frame among the series of radio frames. For example discovery management component 308 of FIG. 3 may be operative to determine a discovery signal transmission schedule 318 for a series of radio frames based on discovery signal muting pattern 322, which may specify at least one discovery-muted radio frame among the series of radio frames. At 1104, at least one primary synchronization signal (PSS) and at least one secondary synchronization signal (SSS) may be transmitted during the series of radio frames according to the discovery signal transmission schedule. For example, communications component 306 of FIG. 3 may be operative on RF transceiver 342 and/or RF antenna(s) 344 to transmit at least one PSS 312 and at least one SSS 314 during the series of radio frames according to discovery signal transmission schedule 318. The embodiments are not limited to these examples.

FIG. 12 illustrates one embodiment of a logic flow 1200, which may be representative of the operations executed by one or more embodiments described herein. More particularly, logic flow 1200 may be representative of operations that may be performed in various embodiments by apparatus 300 and/or system 340 of FIG. 3. As shown in logic flow 1200, a first set of carriers and a second set of carriers may be selected at 1202 from among a plurality of carriers in a frequency band of an eNB based on a discovery signal transmission pattern, and the first set of carriers may comprise at least one non-central carrier of the plurality of carriers. For example, discovery management component 308 of FIG. 3 may be operative to select a first set of carriers and a second set of carriers from among a plurality of carriers in a frequency band of apparatus 300 and/or system 340 based on discovery signal transmission pattern 316, and the first set of carriers may comprise at least one non-central carrier of the plurality of carriers. At 1204, a first set of small cell discovery signals may be transmitted over the first set of carriers during a first frame. For example, communications component 306 of FIG. 3 may be operative on RF transceiver 342 and/or RF antenna(s) 344 to transmit a first set of small cell discovery signals 310 over the first set of carriers during a first frame. At 1206, a second set of small cell discovery signals may be transmitted over the second set of carriers during a second frame. For example, communications component 306 of FIG. 3 may be operative on RF transceiver 342 and/or RF antenna(s) 344 to transmit a second set of small cell discovery signals 310 over the second set of carriers during a second frame. The embodiments are not limited to these examples.

Figure 13:
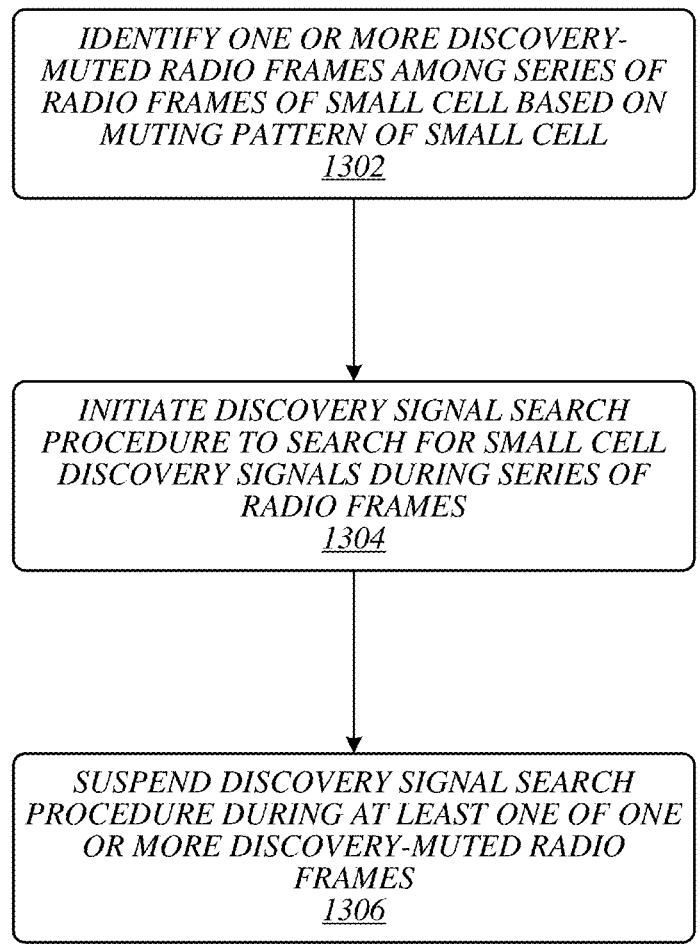
FIG. 13 illustrates an embodiment of a third logic flow.

FIG. 13 illustrates one embodiment of a logic flow 1300, which may be representative of the operations executed by one or more embodiments described herein. More particularly, logic flow 1300 may be representative of operations that may be performed in some embodiments by apparatus 1000 and/or system 1040 of FIG. 10. As shown in logic flow 1300, one or more discovery-muted radio frames among a series of radio frames of a small cell may be identified at 1302 based on a muting pattern of the small cell. For example, discovery management component 1008 of FIG. 10 may be operative to identify one or more discovery-muted radio frames among a series of radio frames of a small cell served by eNB 1060 based on a discovery signal muting pattern 1022 for the small cell. At 1304, a discovery signal search procedure may be initiated to search for small cell discovery signals during the series of radio frames. For example, discovery management component 1008 of FIG. 10 may be operative to initiate a discovery signal search procedure to search for small cell discovery signals during the series of radio frames. At 1306, the discovery signal search procedure may be suspended during at least one of the one or more discovery-muted radio frames. For example, discovery management component 1008 of FIG. 10 may be operative to suspend the discovery signal search procedure during at least one of the one or more discovery-muted radio frames identified based on the discovery signal muting pattern 1022 for the small cell. The embodiments are not limited to these examples.

FIG. 14 illustrates an embodiment of a storage medium 1400. Storage medium 1400 may comprise any non-transitory computer-readable storage medium or machine-readable storage medium, such as an optical, magnetic or semiconductor storage medium. In various embodiments, storage medium 1400 may comprise an article of manufacture. In some embodiments, storage medium 1400 may store computer-executable instructions, such as computer-executable instructions to implement one or more of logic flow 1100 of FIG. 11, logic flow 1200 of FIG. 12, and logic flow 1300 of FIG. 13. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 15:
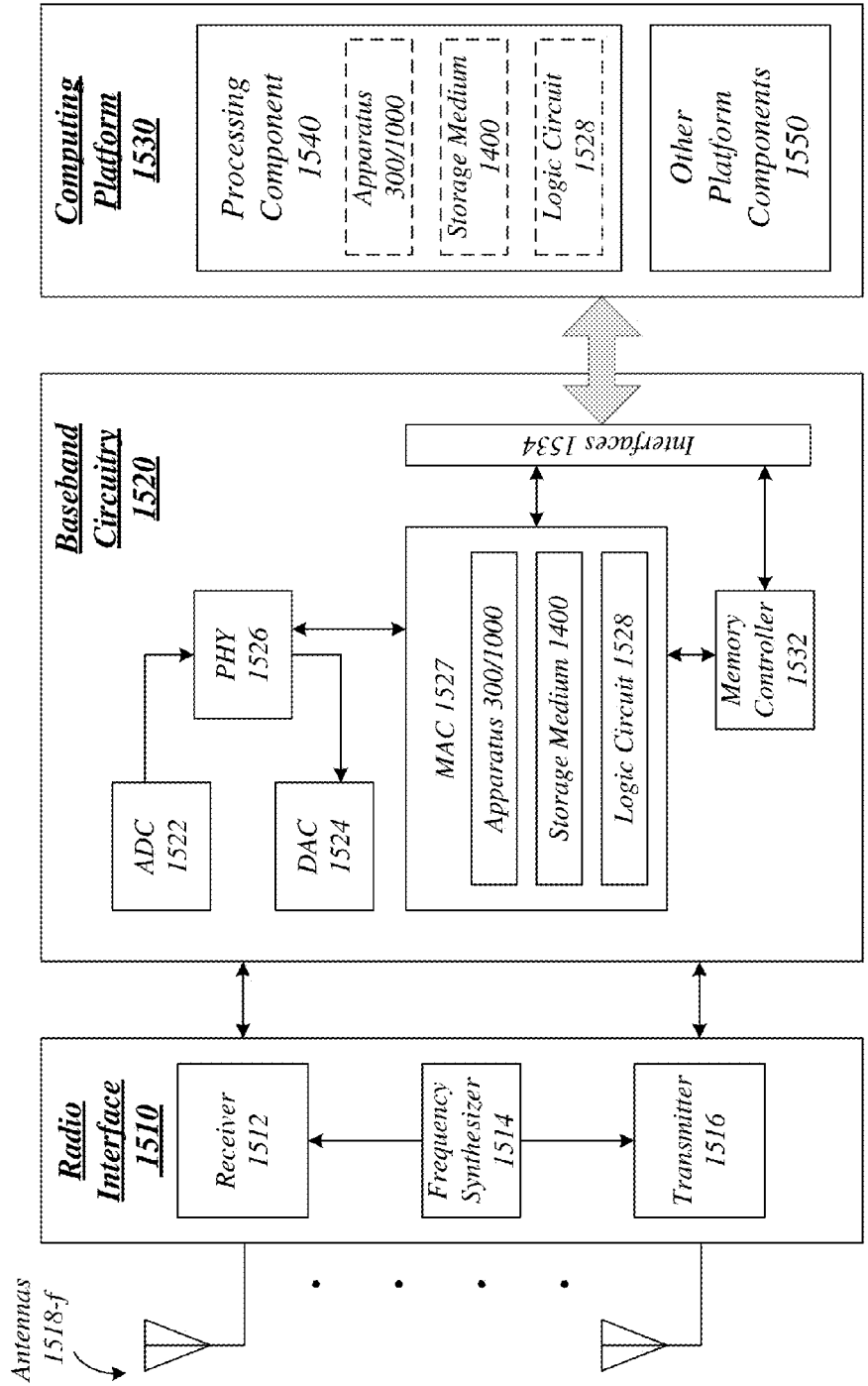
FIG. 15 illustrates an embodiment a device.

FIG. 15 illustrates an embodiment of a communications device 1500 that may implement one or more of apparatus 300 and/or system 340 of FIG. 3, apparatus 1000 and/or system 1040 of FIG. 10, logic flow 1100 of FIG. 11, logic flow 1200 of FIG. 12, logic flow 1300 of FIG. 13, and storage medium 1400 of FIG. 14. In various embodiments, device 1500 may comprise a logic circuit 1528. The logic circuit 1528 may include physical circuits to perform operations described for one or more of apparatus 300 and/or system 340 of FIG. 3, apparatus 1000 and/or system 1040 of FIG. 10, logic flow 1100 of FIG. 11, logic flow 1200 of FIG. 12, and logic flow 1300 of FIG. 13, for example. As shown in FIG. 15, device 1500 may include a radio interface 1510, baseband circuitry 1520, and computing platform 1530, although the embodiments are not limited to this configuration.

The device 1500 may implement some or all of the structure and/or operations for one or more of apparatus 300 and/or system 340 of FIG. 3, apparatus 1000 and/or system 1040 of FIG. 10, logic flow 1100 of FIG. 11, logic flow 1200 of FIG. 12, logic flow 1300 of FIG. 13, storage medium 1400 of FIG. 14, and logic circuit 1528 in a single computing entity, such as entirely within a single device. Alternatively, the device 1500 may distribute portions of the structure and/or operations for one or more of apparatus 300 and/or system 340 of FIG. 3, apparatus 1000 and/or system 1040 of FIG. 10, logic flow 1100 of FIG. 11, logic flow 1200 of FIG. 12, logic flow 1300 of FIG. 13, storage medium 1400 of FIG. 14, and logic circuit 1528 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1510 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1510 may include, for example, a receiver 1512, a frequency synthesizer 1514, and/or a transmitter 1516. Radio interface 1510 may include bias controls, a crystal oscillator and/or one or more antennas 1518-f. In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, an analog-to-digital converter 1522 for down converting received signals, a digital-to-analog converter 1524 for up converting signals for transmission. Further, baseband circuitry 1520 may include a baseband or physical layer (PHY) processing circuit 1526 for PHY link layer processing of respective receive/transmit signals. Baseband circuitry 1520 may include, for example, a medium access control (MAC) processing circuit 1527 for MAC/data link layer processing. Baseband circuitry 1520 may include a memory controller 1532 for communicating with MAC processing circuit 1527 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames. Alternatively or in addition, MAC processing circuit 1527 may share processing for certain of these functions or perform these processes independent of PHY processing circuit 1526. In some embodiments, MAC and PHY processing may be integrated into a single circuit.

The computing platform 1530 may provide computing functionality for the device 1500. As shown, the computing platform 1530 may include a processing component 1540. In addition to, or alternatively of, the baseband circuitry 1520, the device 1500 may execute processing operations or logic for one or more of apparatus 300 and/or system 340 of FIG. 3, apparatus 1000 and/or system 1040 of FIG. 10, logic flow 1100 of FIG. 11, logic flow 1200 of FIG. 12, logic flow 1300 of FIG. 13, storage medium 1400 of FIG. 14, and logic circuit 1528 using the processing component 1540. The processing component 1540 (and/or PHY 1526 and/or MAC 1527) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1500 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired.

Embodiments of device 1500 may be implemented using single input single output (SISO) architectures. However, certain implementations may include multiple antennas (e.g., antennas 1518-*f*) for transmission and/or reception using adaptive antenna techniques for beamforming or spatial division multiple access (SDMA) and/or using MIMO communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 16:
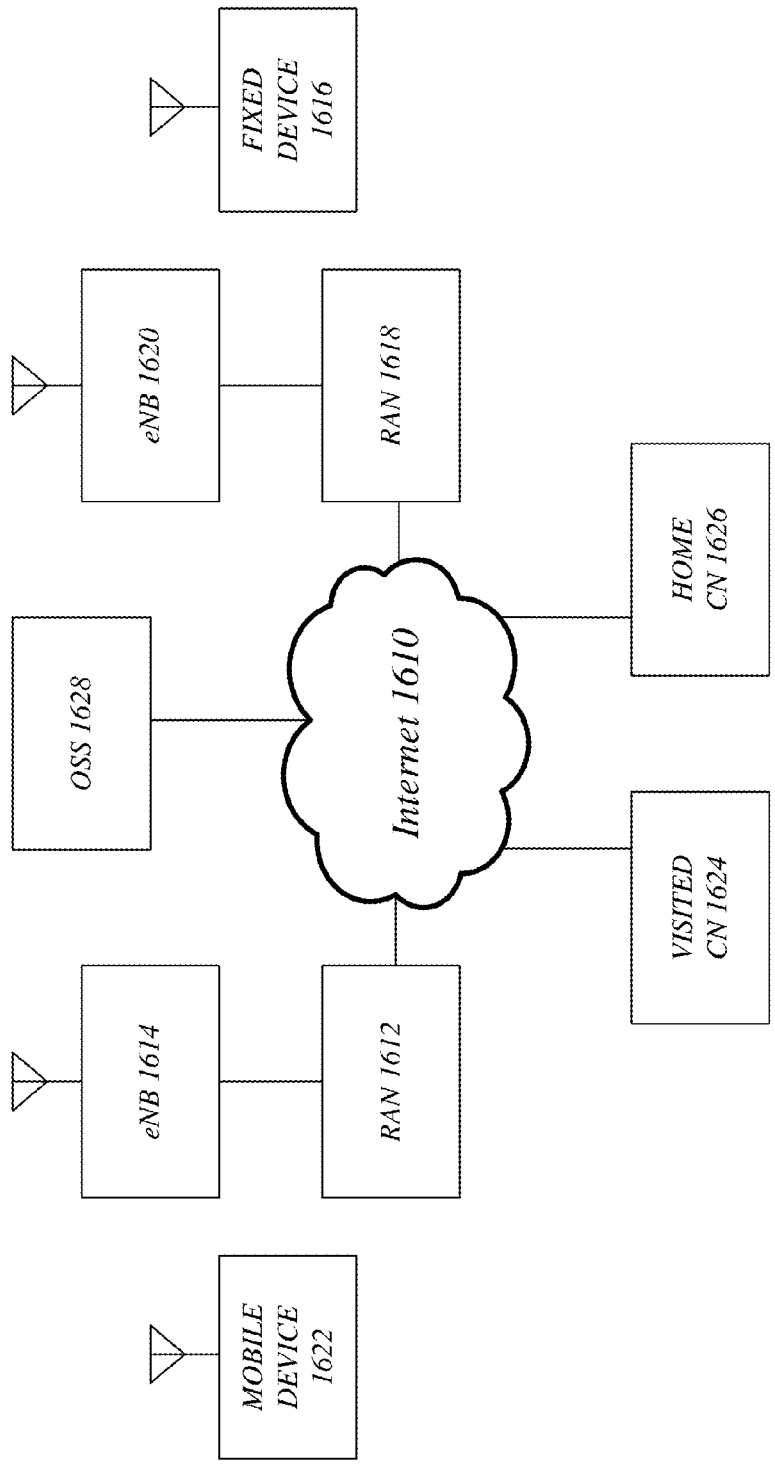
FIG. 16 illustrates an embodiment of a wireless network.

FIG. 16 illustrates an embodiment of a broadband wireless access system 1600. As shown in FIG. 16, broadband wireless access system 1600 may be an internet protocol (IP) type network comprising an internet 1610 type network or the like that is capable of supporting mobile wireless access and/or fixed wireless access to internet 1610. In one or more embodiments, broadband wireless access system 1600 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1600, radio access networks (RANs) 1612 and 1618 are capable of coupling with evolved node Bs (eNBs) 1614 and 1620, respectively, to provide wireless communication between one or more fixed devices 1616 and internet 1610 and/or between or one or more mobile devices 1622 and Internet 1610. One example of a fixed device 1616 and a mobile device 1622 is device 1500 of FIG. 15, with the fixed device 1616 comprising a stationary version of device 1500 and the mobile device 1622 comprising a mobile version of device 1500. RANs 1612 and 1618 may implement profiles that are capable of defining the mapping of network functions to one or more physical entities on broadband wireless access system 1600. eNBs 1614 and 1620 may comprise radio equipment to provide RF communication with fixed device 1616 and/or mobile device 1622, such as described with reference to device 1500, and may comprise, for example, the PHY and MAC layer equipment in compliance with a 3GPP LTE Specification or an IEEE 802.16 Standard. eNBs 1614 and 1620 may further comprise an IP backplane to couple to Internet 1610 via RANs 1612 and 1618, respectively, although the scope of the claimed subject matter is not limited in these respects.

Broadband wireless access system 1600 may further comprise a visited core network (CN) 1624 and/or a home CN 1626, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1624 and/or home CN 1626, and the scope of the claimed subject matter is not limited in these respects. Visited CN 1624 may be referred to as a visited CN in the case where visited CN 1624 is not part of the regular service provider of fixed device 1616 or mobile device 1622, for example where fixed device 1616 or mobile device 1622 is roaming away from its respective home CN 1626, or where broadband wireless access system 1600 is part of the regular service provider of fixed device 1616 or mobile device 1622 but where broadband wireless access system 1600 may be in another location or state that is not the main or home location of fixed device 1616 or mobile device 1622. The embodiments are not limited in this context.

Fixed device 1616 may be located anywhere within range of one or both of eNBs 1614 and 1620, such as in or near a home or business to provide home or business customer broadband access to Internet 1610 via eNBs 1614 and 1620 and RANs 1612 and 1618, respectively, and home CN 1626. It is worthy of note that although fixed device 1616 is generally disposed in a stationary location, it may be moved to different locations as needed. Mobile device 1622 may be utilized at one or more locations if mobile device 1622 is within range of one or both of eNBs 1614 and 1620, for example. In accordance with one or more embodiments, operation support system (OSS) 1628 may be part of broadband wireless access system 1600 to provide management functions for broadband wireless access system 1600 and to provide interfaces between functional entities of broadband wireless access system 1600. Broadband wireless access system 1600 of FIG. 16 is merely one type of wireless network showing a certain number of the components of broadband wireless access system 1600, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an evolved node B (eNB), comprising logic, at least a portion of which is in hardware, the logic to determine a discovery signal transmission schedule for a series of radio frames based on a discovery signal muting pattern specifying at least one discovery-muted radio frame among the series of radio frames, and a transceiver to transmit at least one primary synchronization signal (PSS) and at least one secondary synchronization signal (SSS) during the series of radio frames according to the discovery signal transmission schedule.

In Example 2, the logic of Example 1 may optionally determine the discovery signal muting pattern based on a received information element (IE) comprising a configuration of the discovery signal muting pattern.

In Example 3, the logic of any of Examples 1 to 2 may optionally determine the discovery signal muting pattern based on a physical cell identifier (PCID) of a small cell served by the eNB.

In Example 4, the discovery signal muting of any of Examples 1 to 3 pattern may optionally comprise a multi-frame periodicity.

In Example 5, the transceiver of any of Examples 1 to 4 may optionally transmit at least one legacy discovery signal during at least one discovery-muted radio frame.

In Example 6, the transceiver of any of Examples 1 to 5 may optionally transmit at least one small cell discovery signal over a non-central carrier of a frequency band of the eNB, according to the discovery signal transmission schedule.

In Example 7, the discovery signal transmission schedule of any of Examples 1 to 6 may optionally define an extended time interval between small cell discovery signal transmissions or a reduced time interval between small cell discovery signal transmissions, in conjunction with a discontinuous transmission (DTX) operation mode.

In Example 8, the logic of any of Examples 1 to 7 may optionally determine the discovery signal transmission schedule based on the discovery signal muting pattern and on a multi-frame discovery signal transmission pattern.

Example 9 is a system, comprising an eNB according to any of Examples 1 to 8 and one or more radio frequency (RF) antennas.

Example 10 is at least one non-transitory computer-readable storage medium comprising a set of wireless communication instructions that, in response to being executed at user equipment (UE), cause the UE to identify one or more discovery-muted radio frames among a series of radio frames of a small cell based on a muting pattern of the small cell, initiate a discovery signal search procedure to search for small cell discovery signals during the series of radio frames, and suspend the discovery signal search procedure during at least one of the one or more discovery-muted radio frames.

In Example 11, the at least one non-transitory computer-readable storage medium of Example 10 may optionally comprise wireless communication instructions that, in response to being executed at the UE, cause the UE to determine the muting pattern based on a physical cell identifier (PCID) of the small cell.

In Example 12, the muting pattern of any of Examples 10 to 11 may optionally comprise a periodicity of more than one radio frame.

In Example 13, the at least one non-transitory computer-readable storage medium of any of Examples 10 to 12 may optionally comprise wireless communication instructions that, in response to being executed at the UE, cause the UE to initiate the discovery signal search procedure to search for small cell discovery signals according to a discovery signal transmission pattern.

In Example 14, the discovery signal transmission pattern of Example 13 may optionally define a frequency-hopping scheme for small cell discovery signals of the small cell.

In Example 15, the discovery signal transmission pattern of any of Examples 13 to 14 may optionally assign at least one small cell discovery signal to at least one non-central carrier of the small cell.

In Example 16, the at least one non-transitory computer-readable storage medium of any of Examples 10 to 15 may optionally comprise wireless communication instructions that, in response to being executed at the UE, cause the UE to receive one or more primary synchronization signals (PSSs) via the discovery signal search procedure.

In Example 17, the at least one non-transitory computer-readable storage medium of any of Examples 10 to 16 may optionally comprise wireless communication instructions that, in response to being executed at the UE, cause the UE to receive one or more secondary synchronization signals (SSSs) via the discovery signal search procedure.

Example 18 is a wireless communication method, comprising selecting, by a processor circuit at an evolved node B (eNB), a first set of carriers and a second set of carriers from among a plurality of carriers in a frequency band of the eNB based on a discovery signal transmission pattern, the first set of carriers comprising at least one non-central carrier of the plurality of carriers, transmitting a first set of small cell discovery signals over the first set of carriers during a first frame, and transmitting a second set of small cell discovery signals over the second set of carriers during a second frame.

In Example 19, the second set of carriers of Example 18 may optionally comprise at least one carrier that is not comprised in the first set of carriers.

In Example 20, the wireless communication method of any of Examples 18 to 19 may optionally comprise transmitting a set of legacy discovery signals over one or more central carriers of the plurality of carriers in the frequency band of the eNB during the first frame.

In Example 21, the first set of small cell discovery signals of Example 20 may optionally comprise one or more dedicated small cell primary synchronization signals (PSSs) and one or more dedicated small cell secondary synchronization signals (SSSs), and the set of legacy discovery signals of Example 20 may optionally comprise one or more legacy PSSs and one or more legacy SSSs.

In Example 22, the wireless communication method of any of Examples 18 to 21 may optionally comprise muting one or more discovery signals during at least one of a plurality of frames comprising the first frame and the second frame, based on a discovery signal muting pattern for a cell served by the eNB.

In Example 23, the wireless communication method of Example 22 may optionally comprise determining the discovery signal muting pattern for the cell based on a physical cell identifier (PCID) for the cell.

In Example 24, the eNB of any of Examples 22 to 23 may optionally be configured with the discovery signal muting pattern for the cell via higher-layer signaling.

In Example 25, the first set of small cell discovery signals of any of Examples 18 to 24 may optionally comprise at least one cell-specific reference signal (CRS).

Example 26 is at least one non-transitory computer-readable storage medium comprising a set of instructions that, in response to being executed on a computing device, cause the computing device to perform a wireless communication method according to any of Examples 18 to 25.

Example 27 is an apparatus, comprising means for performing a wireless communication method according to any of Examples 18 to 25.

Example 28 is a system, comprising an apparatus according to Example 27, a radio frequency (RF) transceiver, and one or more RF antennas.

Example 29 is user equipment (UE), comprising logic, at least a portion of which is in hardware, the logic to identify one or more discovery-muted radio frames among a series of radio frames of a small cell based on a muting pattern of the small cell, initiate a discovery signal search procedure to search for small cell discovery signals during the series of radio frames, and suspend the discovery signal search procedure during at least one of the one or more discovery-muted radio frames.

In Example 30, the logic of Example 29 may optionally determine the muting pattern based on a physical cell identifier (PCID) of the small cell.

In Example 31, the muting pattern of any of Examples 29 to 30 may optionally comprise a periodicity of more than one radio frame.

In Example 32, the logic of any of Examples 29 to 31 may optionally initiate the discovery signal search procedure to search for small cell discovery signals according to a discovery signal transmission pattern.

In Example 33, the discovery signal transmission pattern of Example 32 may optionally define a frequency-hopping scheme for small cell discovery signals of the small cell.

In Example 34, the discovery signal transmission pattern of any of Examples 32 to 33 may optionally assign at least one small cell discovery signal to at least one non-central carrier of the small cell.

In Example 35, the logic of any of Examples 29 to 34 may optionally receive one or more primary synchronization signals (PSSs) via the discovery signal search procedure.

In Example 36, the logic of any of Examples 29 to 35 may optionally receive one or more secondary synchronization signals (SSSs) via the discovery signal search procedure.

Example 37 is a system, comprising a UE according to any of Examples 29 to 36, a radio frequency (RF) transceiver, one or more RF antennas, and a display.

Example 38 is at least one non-transitory computer-readable storage medium comprising a set of wireless communication instructions that, in response to being executed at an evolved node B (eNB), cause the eNB to select a first set of carriers and a second set of carriers from among a plurality of carriers in a frequency band of the eNB based on a discovery signal transmission pattern, the first set of carriers comprising at least one non-central carrier of the plurality of carriers, transmit a first set of small cell discovery signals over the first set of carriers during a first frame, and transmit a second set of small cell discovery signals over the second set of carriers during a second frame.

In Example 39, the second set of carriers of Example 38 may optionally comprise at least one carrier that is not comprised in the first set of carriers.

In Example 40, the at least one non-transitory computer-readable storage medium of any of Examples 38 to 39 may optionally comprise wireless communication instructions that, in response to being executed at the eNB, cause the eNB to transmit a set of legacy discovery signals over one or more central carriers of the plurality of carriers in the frequency band of the eNB during the first frame.

In Example 41, the first set of small cell discovery signals of Example 40 may optionally comprise one or more dedicated small cell primary synchronization signals (PSSs) and one or more dedicated small cell secondary synchronization signals (SSSs), and the set of legacy discovery signals of Example 40 may optionally comprise one or more legacy PSSs and one or more legacy SSSs.

In Example 42, the at least one non-transitory computer-readable storage medium of any of Examples 38 to 41 may optionally comprise wireless communication instructions that, in response to being executed at the eNB, cause the eNB to mute one or more discovery signals during at least one of a plurality of frames comprising the first frame and the second frame, based on a discovery signal muting pattern for a cell served by the eNB.

In Example 43, the at least one non-transitory computer-readable storage medium of Example 42 may optionally comprise wireless communication instructions that, in response to being executed at the eNB, cause the eNB to determine the discovery signal muting pattern for the cell based on a physical cell identifier (PCID) for the cell.

In Example 44, the eNB of any of Examples 42 to 43 may optionally be configured with the discovery signal muting pattern for the cell via higher-layer signaling.

In Example 45, the first set of small cell discovery signals of any of Examples 38 to 44 may optionally comprise at least one cell-specific reference signal (CRS).

Example 46 is a wireless communication method, comprising determining, by a processor circuit at an evolved node B (eNB), a discovery signal transmission schedule for a series of radio frames based on a discovery signal muting pattern specifying at least one discovery-muted radio frame among the series of radio frames, and transmitting at least one primary synchronization signal (PSS) and at least one secondary synchronization signal (SSS) during the series of radio frames according to the discovery signal transmission schedule.

In Example 47, the wireless communication method of Example 46 may optionally comprise determining the discovery signal muting pattern based on a received information element (IE) comprising a configuration of the discovery signal muting pattern.

In Example 48, the wireless communication method of any of Examples 46 to 47 may optionally comprise determining the discovery signal muting pattern based on a physical cell identifier (PCID) of a small cell served by the eNB.

In Example 49, the discovery signal muting pattern of any of Examples 46 to 48 may optionally comprise a multi-frame periodicity.

In Example 50, the wireless communication method of any of Examples 46 to 49 may optionally comprise transmitting at least one legacy discovery signal during at least one discovery-muted radio frame.

In Example 51, the wireless communication method of any of Examples 46 to 50 may optionally comprise transmitting at least one small cell discovery signal over a non-central carrier of a frequency band of the eNB, according to the discovery signal transmission schedule.

In Example 52, the discovery signal transmission schedule of any of Examples 46 to 51 may optionally define an extended time interval between small cell discovery signal transmissions or a reduced time interval between small cell discovery signal transmissions, in conjunction with a discontinuous transmission (DTX) operation mode.

In Example 53, the wireless communication method of any of Examples 46 to 52 may optionally comprise determining the discovery signal transmission schedule based on the discovery signal muting pattern and on a multi-frame discovery signal transmission pattern.

Example 54 is at least one non-transitory computer-readable storage medium comprising a set of instructions that, in response to being executed on a computing device, cause the computing device to perform a wireless communication method according to any of Examples 46 to 53.

Example 55 is an apparatus, comprising means for performing a wireless communication method according to any of Examples 46 to 53.

Example 56 is a system, comprising an apparatus according to Example 55, a radio frequency (RF) transceiver, and one or more RF antennas.

Example 57 is an evolved node B (eNB), comprising logic, at least a portion of which is in hardware, the logic to select a first set of carriers and a second set of carriers from among a plurality of carriers in a frequency band of the eNB based on a discovery signal transmission pattern, the first set of carriers comprising at least one non-central carrier of the plurality of carriers, the logic to transmit a first set of small cell discovery signals over the first set of carriers during a first frame and transmit a second set of small cell discovery signals over the second set of carriers during a second frame.

In Example 58, the second set of carriers of Example 57 may optionally comprise at least one carrier that is not comprised in the first set of carriers.

In Example 59, the logic of any of Examples 57 to 58 may optionally transmit a set of legacy discovery signals over one or more central carriers of the plurality of carriers in the frequency band of the eNB during the first frame.

In Example 60, the first set of small cell discovery signals of Example 59 may optionally comprise one or more dedicated small cell primary synchronization signals (PSSs) and one or more dedicated small cell secondary synchronization signals (SSSs), and the set of legacy discovery signals of Example 59 may optionally comprise one or more legacy PSSs and one or more legacy SSSs.

In Example 61, the logic of any of Examples 57 to 60 may optionally mute one or more discovery signals during at least one of a plurality of frames comprising the first frame and the second frame, based on a discovery signal muting pattern for a cell served by the eNB.

In Example 62, the logic of Example 61 may optionally determine the discovery signal muting pattern for the cell based on a physical cell identifier (PCID) for the cell.

In Example 63, the logic of any of Examples 61 to 62 may optionally be configured with the discovery signal muting pattern for the cell via higher-layer signaling.

In Example 64, the first set of small cell discovery signals of any of Examples 57 to 63 may optionally comprise at least one cell-specific reference signal (CRS).

Example 65 is a system, comprising an eNB according to any of Examples 57 to 64, a radio frequency (RF) transceiver, and one or more RF antennas.

Example 66 is at least one non-transitory computer-readable storage medium comprising a set of wireless communication instructions that, in response to being executed at an evolved node B (eNB), cause the eNB to determine a discovery signal transmission schedule for a series of radio frames based on a discovery signal muting pattern specifying at least one discovery-muted radio frame among the series of radio frames, and transmit at least one primary synchronization signal (PSS) and at least one secondary synchronization signal (SSS) during the series of radio frames according to the discovery signal transmission schedule.

In Example 67, the at least one non-transitory computer-readable storage medium of Example 66 may optionally comprise wireless communication instructions that, in response to being executed at the eNB, cause the eNB to determine the discovery signal muting pattern based on a received information element (IE) comprising a configuration of the discovery signal muting pattern.

In Example 68, the at least one non-transitory computer-readable storage medium of any of Examples 66 to 67 may optionally comprise wireless communication instructions that, in response to being executed at the eNB, cause the eNB to determine the discovery signal muting pattern based on a physical cell identifier (PCID) of a small cell served by the eNB.

In Example 69, the discovery signal muting pattern of any of Examples 66 to 68 may optionally comprise a multi-frame periodicity.

In Example 70, the at least one non-transitory computer-readable storage medium of any of Examples 66 to 69 may optionally comprise wireless communication instructions that, in response to being executed at the eNB, cause the eNB to transmit at least one legacy discovery signal during at least one discovery-muted radio frame.

In Example 71, the at least one non-transitory computer-readable storage medium of any of Examples 66 to 70 may optionally comprise wireless communication instructions that, in response to being executed at the eNB, cause the eNB to transmit at least one small cell discovery signal over a non-central carrier of a frequency band of the eNB, according to the discovery signal transmission schedule.

In Example 72, the discovery signal transmission schedule of any of Examples 66 to 71 may optionally define an extended time interval between small cell discovery signal transmissions or a reduced time interval between small cell discovery signal transmissions, in conjunction with a discontinuous transmission (DTX) operation mode.

In Example 73, the at least one non-transitory computer-readable storage medium of any of Examples 66 to 72 may optionally comprise wireless communication instructions that, in response to being executed at the eNB, cause the eNB to determine the discovery signal transmission schedule based on the discovery signal muting pattern and on a multi-frame discovery signal transmission pattern.

Example 74 is a wireless communication method, comprising identifying, by a processor circuit at a user equipment (UE), one or more discovery-muted radio frames among a series of radio frames of a small cell based on a muting pattern of the small cell, initiating a discovery signal search procedure to search for small cell discovery signals during the series of radio frames, and suspending the discovery signal search procedure during at least one of the one or more discovery-muted radio frames.

In Example 75, the wireless communication method of Example 74 may optionally comprise determining the muting pattern based on a physical cell identifier (PCID) of the small cell.

In Example 76, the muting pattern of any of Examples 74 to 75 may optionally comprise a periodicity of more than one radio frame.

In Example 77, the wireless communication method of any of Examples 74 to 76 may optionally comprise initiating the discovery signal search procedure to search for small cell discovery signals according to a discovery signal transmission pattern.

In Example 78, the discovery signal transmission pattern of Example 77 may optionally define a frequency-hopping scheme for small cell discovery signals of the small cell.

In Example 79, the discovery signal transmission pattern of any of Examples 77 to 78 may optionally assign at least one small cell discovery signal to at least one non-central carrier of the small cell.

In Example 80, the wireless communication method of any of Examples 74 to 79 may optionally comprise receiving one or more primary synchronization signals (PSSs) via the discovery signal search procedure.

In Example 81, the wireless communication method of any of Examples 74 to 80 may optionally comprise receiving one or more secondary synchronization signals (SSSs) via the discovery signal search procedure.

Example 82 is at least one non-transitory computer-readable storage medium comprising a set of instructions that, in response to being executed on a computing device, cause the computing device to perform a wireless communication method according to any of Examples 74 to 81.

Example 83 is an apparatus, comprising means for performing a wireless communication method according to any of Examples 74 to 81.

Example 84 is a system, comprising an apparatus according to Example 83, a radio frequency (RF) transceiver, one or more RF antennas, and a display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An evolved node B (eNB), comprising:
   logic, at least a portion of which is in hardware, the logic to determine a discovery signal transmission schedule for a series of radio frames based on a discovery signal muting pattern specifying at least one discovery-muted radio frame among the series of radio frames; and
   a transceiver to transmit at least one primary synchronization signal (PSS) and at least one secondary synchronization signal (SSS) during the series of radio frames according to the discovery signal transmission schedule.

2. The eNB of claim 1, the logic to determine the discovery signal muting pattern based on a received information element (IE) comprising a configuration of the discovery signal muting pattern.

3. The eNB of claim 1, the logic to determine the discovery signal muting pattern based on a physical cell identifier (PCID) of a small cell served by the eNB.

4. The eNB of claim 1, the discovery signal muting pattern comprising a multi-frame periodicity.

5. The eNB of claim 1, the transceiver to transmit at least one legacy discovery signal during at least one discovery-muted radio frame.

6. The eNB of claim 1, the transceiver to transmit at least one small cell discovery signal over a non-central carrier of a frequency band of the eNB, according to the discovery signal transmission schedule.

7. The eNB of claim 1, the discovery signal transmission schedule defining an extended time interval between small cell discovery signal transmissions or a reduced time interval between small cell discovery signal transmissions, in conjunction with a discontinuous transmission (DTX) operation mode.

8. The eNB of claim 1, the logic to determine the discovery signal transmission schedule based on the discovery signal muting pattern and on a multi-frame discovery signal transmission pattern.

9. The eNB of claim 1, comprising one or more radio frequency (RF) antennas.

10. At least one non-transitory computer-readable storage medium comprising a set of instructions that, in response to being executed at an evolved node B (eNB), cause the eNB to:
    select a first set of carriers and a second set of carriers from among a plurality of carriers in a frequency band of the eNB based on a discovery signal transmission pattern, the first set of carriers comprising at least one non-central carrier of the plurality of carriers;
    transmit a first set of small cell discovery signals over the first set of carriers during a first frame; and
    transmit a second set of small cell discovery signals over the second set of carriers during a second frame.

11. The at least one non-transitory computer-readable storage medium of claim 10, the second set of carriers comprising at least one carrier that is not comprised in the first set of carriers.

12. The at least one non-transitory computer-readable storage medium of claim 10, comprising instructions that, in response to being executed at the eNB, cause the eNB to transmit a set of legacy discovery signals over one or more central carriers of the plurality of carriers in the frequency band of the eNB during the first frame.

13. The at least one non-transitory computer-readable storage medium of claim 12, the first set of small cell discovery signals comprising one or more dedicated small cell primary synchronization signals (PSSs) and one or more dedicated small cell secondary synchronization signals (SSSs), the set of legacy discovery signals comprising one or more legacy PSSs and one or more legacy SSSs.

14. The at least one non-transitory computer-readable storage medium of claim 10, comprising instructions that, in response to being executed at the eNB, cause the eNB to mute one or more discovery signals during at least one of a plurality of frames comprising the first frame and the second frame, based on a discovery signal muting pattern for a cell served by the eNB.

15. The at least one non-transitory computer-readable storage medium of claim 14, comprising instructions that, in response to being executed at the eNB, cause the eNB to determine the discovery signal muting pattern for the cell based on a physical cell identifier (PCID) for the cell.

16. The at least one non-transitory computer-readable storage medium of claim 14, the eNB configured with the discovery signal muting pattern for the cell via higher-layer signaling.

17. The at least one non-transitory computer-readable storage medium of claim 10, the first set of small cell discovery signals comprising at least one cell-specific reference signal (CRS).

18. User equipment (UE), comprising:
a memory; and
logic, at least a portion of which is in circuitry coupled to the memory, the logic to identify one or more discovery-muted radio frames among a series of radio frames of a small cell based on a muting pattern of the small cell, initiate a discovery signal search procedure to search for small cell discovery signals during the series of radio frames, and suspend the discovery signal search procedure during at least one of the one or more discovery-muted radio frames.

19. The UE of claim 18, the logic to determine the muting pattern based on a physical cell identifier (PCID) of the small cell.

20. The UE of claim 18, the muting pattern comprising a periodicity of more than one radio frame.

21. The UE of claim 18, the logic to initiate the discovery signal search procedure to search for small cell discovery signals according to a discovery signal transmission pattern.

22. The UE of claim 21, the discovery signal transmission pattern defining a frequency-hopping scheme for small cell discovery signals of the small cell.

23. The UE of claim 21, the discovery signal transmission pattern assigning at least one small cell discovery signal to at least one non-central carrier of the small cell.

24. The UE of claim 18, the logic to receive one or more primary synchronization signals (PSSs) and one or more secondary synchronization signals (SSSs) via the discovery signal search procedure.

25. The UE of claim 18, comprising:
a radio frequency (RF) transceiver;
one or more RF antennas; and
a display.

\* \* \* \* \*